(12) United States Patent
Meier

(10) Patent No.: US 7,203,361 B1
(45) Date of Patent: Apr. 10, 2007

(54) ADAPTIVE DIGITIZER FOR OPTICAL READER

(75) Inventor: Timothy P. Meier, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 10/810,501

(22) Filed: Mar. 26, 2004

Related U.S. Application Data

(63) Continuation of application No. 09/810,202, filed on Mar. 16, 2001, now abandoned.

(51) Int. Cl.
*G06K 9/34* (2006.01)

(52) U.S. Cl. .................................................... 382/173

(58) Field of Classification Search ................ 382/173, 382/312, 313, 273, 318, 214, 270; 358/473, 358/474; 235/454, 460, 462.01, 462.07, 235/462.25, 462.27, 470, 472.01, 472.02, 235/472.03, 462.08, 462.15, 462.16, 462.3, 235/462.45, 487
See application file for complete search history.

(56) References Cited

U.S. PATENT DOCUMENTS

| | | | |
|---|---|---|---|
| 3,582,884 A | 6/1971 | Shepard | |
| 3,723,970 A | 3/1973 | Stoller | |
| 4,097,847 A | 6/1978 | Forsen et al. | |
| 4,628,532 A | 12/1986 | Stone et al. | |
| 4,646,353 A | 2/1987 | Tenge et al. | |
| 4,794,239 A | 12/1988 | Allais | |
| 4,874,936 A | 10/1989 | Chandler et al. | |
| 4,896,029 A | 1/1990 | Chandler et al. | |
| 4,901,073 A | 2/1990 | Kibrick | |
| 4,998,010 A | 3/1991 | Chandler et al. | |
| 5,138,140 A | 8/1992 | Siemiatkowski et al. | |
| 5,153,418 A | 10/1992 | Batterman et al. | |
| 5,159,340 A * | 10/1992 | Smith | 341/132 |
| 5,189,292 A | 2/1993 | Batterman et al. | |
| 5,223,701 A | 6/1993 | Batterman et al. | |
| 5,227,614 A | 7/1993 | Danielson et al. | |
| 5,235,167 A | 8/1993 | Dvorkis et al. | |
| 5,272,323 A | 12/1993 | Martino | |
| 5,286,960 A | 2/1994 | Longacre, Jr. et al. | |
| 5,294,783 A | 3/1994 | Hammond, Jr. et al. | |
| 5,304,786 A | 4/1994 | Pavlidis et al. | |
| 5,304,787 A | 4/1994 | Wang | |
| 5,311,001 A | 5/1994 | Joseph et al. | |
| 5,313,533 A * | 5/1994 | Scott | 382/273 |
| 5,343,028 A | 8/1994 | Figarella et al. | |
| 5,378,881 A | 1/1995 | Adachi | |
| 5,412,197 A | 5/1995 | Smith | |
| 5,418,862 A | 5/1995 | Zheng et al. | |
| 5,422,470 A | 6/1995 | Kubo | |
| 5,428,211 A | 6/1995 | Zheng et al. | |
| 5,430,472 A * | 7/1995 | Curry | 347/232 |
| 5,463,214 A | 10/1995 | Longacre, Jr. et al. | |
| 5,477,042 A | 12/1995 | Wang | |
| 5,478,999 A | 12/1995 | Figarella et al. | |

(Continued)

*Primary Examiner*—Jose L. Couso
(74) *Attorney, Agent, or Firm*—Wall Marjama & Bilinski LLP

(57) ABSTRACT

An optical reader is provided that can include an image sensor. The optical reader can generate an array of miltibit pixel values. The array of multibit pixel values can be processed. In one embodiment, the image sensor can be provided by a 1D image sensor. In one embodiment, the image sensor can be provided by a 2D image sensor.

28 Claims, 18 Drawing Sheets

U.S. PATENT DOCUMENTS

| | | | |
|---|---|---|---|
| 5,479,515 A | 12/1995 | Longacre, Jr. | |
| 5,487,115 A | 1/1996 | Surka | |
| 5,489,769 A | 2/1996 | Kubo | |
| 5,502,297 A * | 3/1996 | Sherman | 235/462.45 |
| 5,524,068 A | 6/1996 | Kacandes et al. | |
| 5,537,431 A | 7/1996 | Chen et al. | |
| 5,565,669 A | 10/1996 | Liu | |
| 5,591,955 A | 1/1997 | Laser | |
| 5,591,956 A | 1/1997 | Longacre, Jr. et al. | |
| 5,600,119 A | 2/1997 | Dvorkis et al. | |
| 5,612,524 A | 3/1997 | Sant' Anselmo et al. | |
| 5,621,203 A | 4/1997 | Swartz et al. | |
| 5,637,849 A | 6/1997 | Wang et al. | |
| 5,638,465 A * | 6/1997 | Sano et al. | 382/281 |
| 5,666,167 A * | 9/1997 | Tults | 348/465 |
| 5,698,833 A | 12/1997 | Skinger | |
| 5,699,447 A | 12/1997 | Alumot et al. | |
| 5,710,417 A | 1/1998 | Joseph et al. | |
| 5,723,853 A | 3/1998 | Longacre, Jr. et al. | |
| 5,726,435 A | 3/1998 | Hara et al. | |
| 5,739,518 A | 4/1998 | Wang | |
| 5,773,806 A | 6/1998 | Longacre, Jr. | |
| 5,773,810 A | 6/1998 | Hussey et al. | |
| 5,774,357 A | 6/1998 | Hoffberg et al. | |
| 5,814,801 A | 9/1998 | Wang et al. | |
| 5,867,594 A | 2/1999 | Cymbalski | |
| 5,867,595 A | 2/1999 | Cymbalski | |
| 5,875,108 A | 2/1999 | Hoffberg et al. | |
| 5,914,476 A | 6/1999 | Gerst, III et al. | |
| 5,917,945 A | 6/1999 | Cymbalski | |
| 5,920,477 A | 7/1999 | Hoffberg et al. | |
| 5,932,862 A | 8/1999 | Hussey et al. | |
| 5,942,741 A | 8/1999 | Longacre, Jr. et al. | |
| 5,949,052 A | 9/1999 | Longacre, Jr. et al. | |
| 5,965,863 A | 10/1999 | Parker et al. | |
| 5,979,763 A | 11/1999 | Wang et al. | |
| 6,012,640 A * | 1/2000 | Liu | 235/462.25 |
| 6,053,407 A | 4/2000 | Wang et al. | |
| 6,064,763 A | 5/2000 | Maltsev | |
| 6,070,800 A | 6/2000 | Fujita et al. | |
| 6,082,619 A | 7/2000 | Ma et al. | |
| 6,082,621 A | 7/2000 | Chan et al. | |
| 6,129,278 A | 10/2000 | Wang et al. | |
| 6,161,760 A | 12/2000 | Marrs et al. | |
| 6,176,428 B1 | 1/2001 | Joseph et al. | |
| 6,264,105 B1 | 7/2001 | Longacre, Jr. et al. | |
| 6,371,373 B1 * | 4/2002 | Ma et al. | 235/462.1 |
| 6,443,360 B1 * | 9/2002 | Marchi et al. | 235/462.25 |
| 6,508,404 B2 | 1/2003 | Hecht | |
| 6,547,142 B1 | 4/2003 | Goren et al. | |
| 6,565,003 B1 | 5/2003 | Ma | |
| 6,575,367 B1 | 6/2003 | Longacre, Jr. | |
| 6,578,768 B1 | 6/2003 | Parker, et al. | |
| 6,672,511 B1 | 1/2004 | Shellhammer | |
| 6,678,412 B1 | 1/2004 | Shigekusa et al. | |
| 6,685,095 B2 | 2/2004 | Roustaei et al. | |
| 6,814,290 B2 | 11/2004 | Longacre | |
| 6,834,806 B2 * | 12/2004 | Benedetti | 235/462.25 |

* cited by examiner

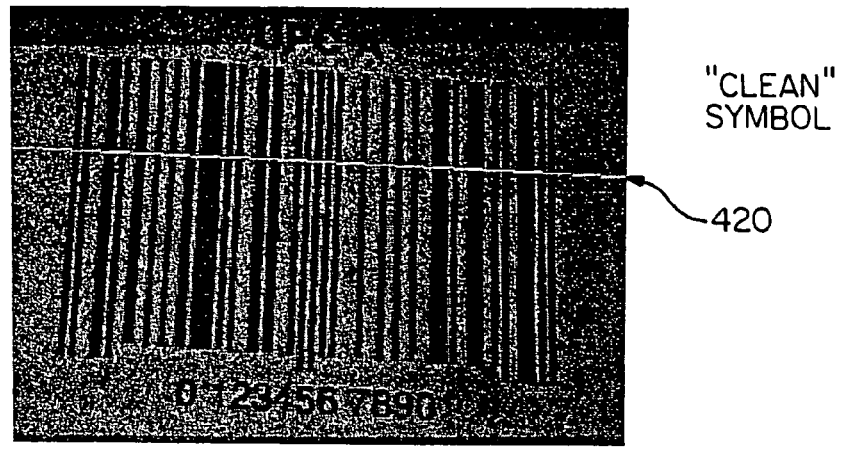
"CLEAN" SYMBOL
FIG.9a
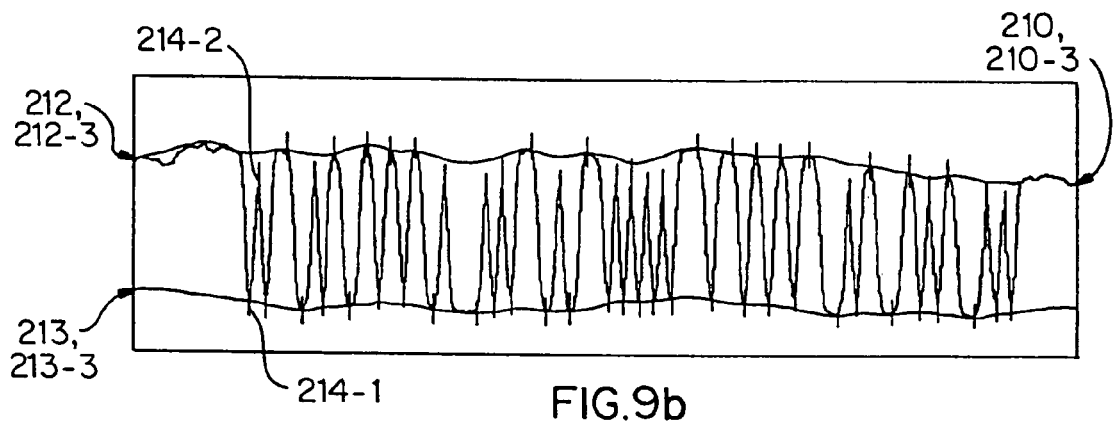
FIG.9b
| THRESHOLD | PEAKS | PEAK LEVEL |
|---|---|---|
| 50% | 59 | 100 |
| 25% | 0 | – |
| 12.5% | 0 | – |
| 6.25% | 3 | 100 |
AVERAGE HIGH PEAK 92%
AVERAGE LOW PEAK 2%
FIG.9c

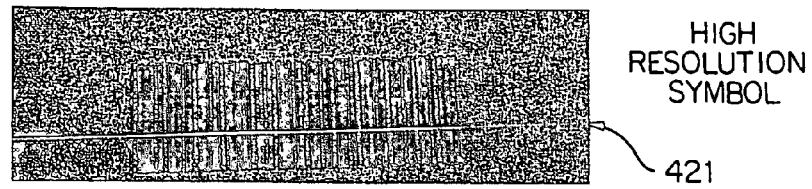
HIGH RESOLUTION SYMBOL
421
FIG.10a
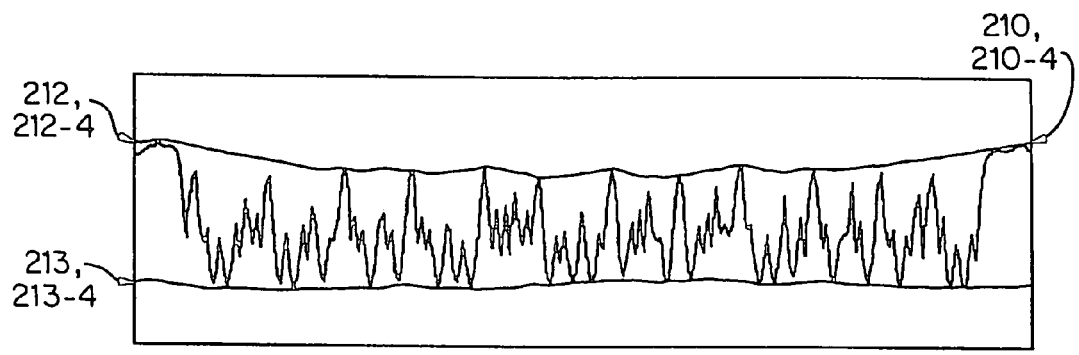
FIG.10b
| 430-2h HIGH PEAK DATA | | | 430,430-2 | 430-2ℓ LOW PEAK DATA | | |
|---|---|---|---|---|---|---|
| THRESHOLD | PEAKS,N | PEAK LEVEL MAX | | THRESHOLD | PEAKS,N | PEAK LEVEL MIN |
| 50% | 17 | 100 | | 50% | 18 | 0 |
| 25% | 20 | 84 | | 25% | 20 | 0 |
| 12.5% | 16 | 60 | | 12.5% | 16 | 19 |
| 6.25% | 13 | 100 | | 6.25% | 13 | 30 |
| AVERAGE HIGH PEAK: 66% | | | | AVERAGE LOW PEAK: 29% | | |
FIG.10c

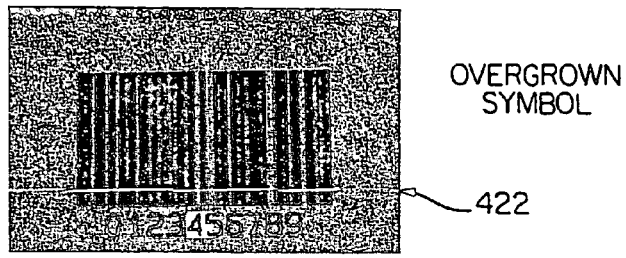
FIG. 11a
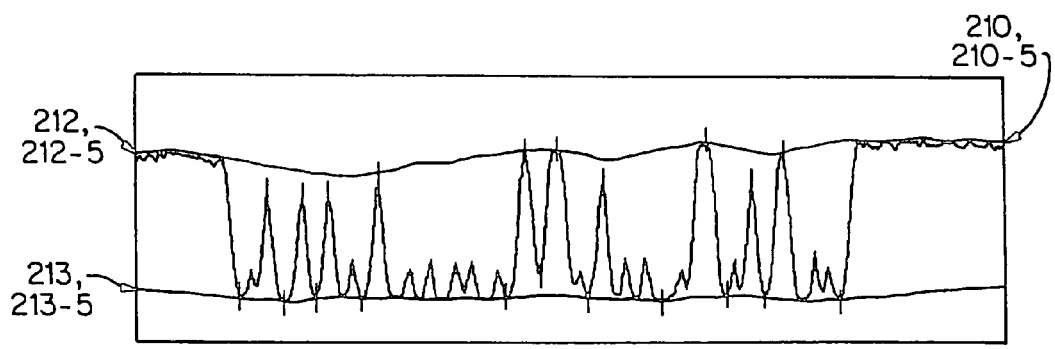
FIG. 11b
| HIGH PEAK DATA 430-3h | | | LOW PEAK DATA 430-3ℓ | | |
|---|---|---|---|---|---|
| THRESHOLD | PEAKS, N | PEAK LEVEL MAX | THRESHOLD | PEAKS, N | PEAK LEVEL MIN |
| 50% | 10 | 100 | 50% | 11 | 0 |
| 25% | 3 | 32 | 25% | 3 | 0 |
| 12.5% | 9 | 28 | 12.5% | 9 | 0 |
| 6.25% | 12 | 100 | 6.25% | 12 | 7 |
| AVERAGE HIGH PEAK: 55% | | | AVERAGE LOW PEAK: 27% | | |
FIG. 11c

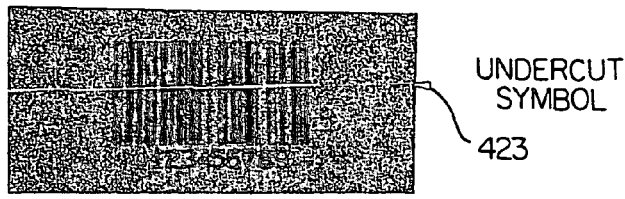
FIG.12a
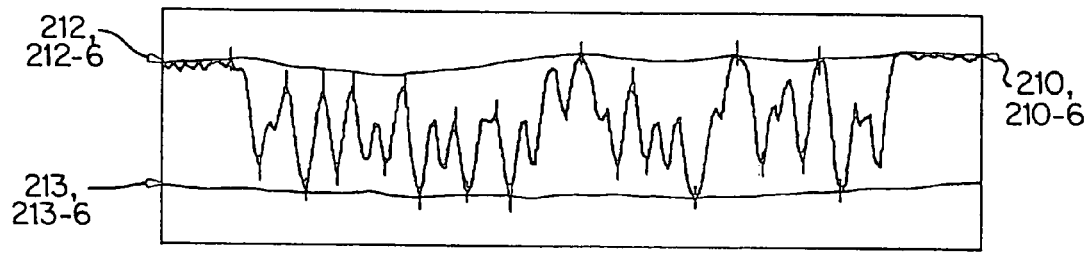
FIG.12b
| HIGH PEAK DATA 430-4h | | | LOW PEAK DATA 430-4ℓ | | |
|---|---|---|---|---|---|
| THRESHOLD | PEAKS,N | PEAK LEVEL MAX | THRESHOLD | PEAKS,N | PEAK LEVEL MIN |
| 50% | 13 | 100 | 50% | 13 | 0 |
| 25% | 16 | 100 | 25% | 16 | 8 |
| 12.5% | 15 | 100 | 12.5% | 15 | 16 |
| 6.25% | 25 | 100 | 6.25% | 23 | 0 |
| AVERAGE HIGH PEAK: 82% | | | AVERAGE LOW PEAK: 32% | | |
FIG.12c

ADAPTIVE DIGITIZER FOR OPTICAL READER

CROSS REFERENCE

This application is a continuation of U.S. patent application Ser. No. 09/810,202, filed on Mar. 16, 2001, now abandoned. The priority of this application is claimed and the disclosure of this application is incorporated herein by reference in its entirety.

FIELD OF THE INVENTION

The invention relates to optical readers in general and particularly to an image data digitization method for use with an optical reader.

BACKGROUND OF THE PRIOR ART

Optical decoding optical readers digitize image data prior to subjecting the image data to decoding processing such as bar code symbology decoding or OCR decoding. It is generally known that the best digitizing algorithm for use in digitizing a certain set of image data depends on features of the image data. A digitization method that may be useful for digitizing image data under a first imaging condition or which correspond to a first type of symbol may not be useful for digitizing image data captured under a second set of imaging conditions or which corresponds to a second type of symbol.

The approach of prior artisans who are cognizant of the fact that a best digitization method for a particular set of image data may vary depending upon features of the image data has been to successively subject the set of image data to multiple digitization algorithms. U.S. Pat. No. 6,082,621, for example, describes an analog digitizer for developing a series of "1" value or "0" value pixel values wherein an analog signal is subjected to multiple grey-to-binary conversion threshold values. If decoding the image data digitized utilizing the first binary conversion threshold fails, the image data is redigitized using a second binary conversion threshold and subjected to decoding again. If decoding again fails, the image data is digitized again using a third binary conversion threshold and so on. In digitization methods which use the reiterative decoding attempt approach method, the digitizing methods useful for digitizing the most commonly encountered image features are tried first, and the least commonly encountered image features last.

It can be seen, therefore, that the above approach can be extremely time consuming. For decoding image data having image features that can be digitized using a method for digitizing rarely seen image features, the image data is subjected to multiple digitation methods and decoding attempts before one is successful. Furthermore, if a symbol representation of a set of image data is of a type that cannot be decoded, several attempts to digitize and decode the symbol representation are nevertheless made.

DETAILED DESCRIPTION OF THE DRAWINGS

For a fuller understanding of the nature and objects of the invention, reference should be made to the following detailed description of a preferred mode of practicing the invention, read in connection with the accompanying drawings, in which:

FIGS. 9a–12c are various diagrams and tables illustrating examples of the invention applied to several different types of bar codes.

DETAILED DESCRIPTION OF THE INVENTION

Figure 1:
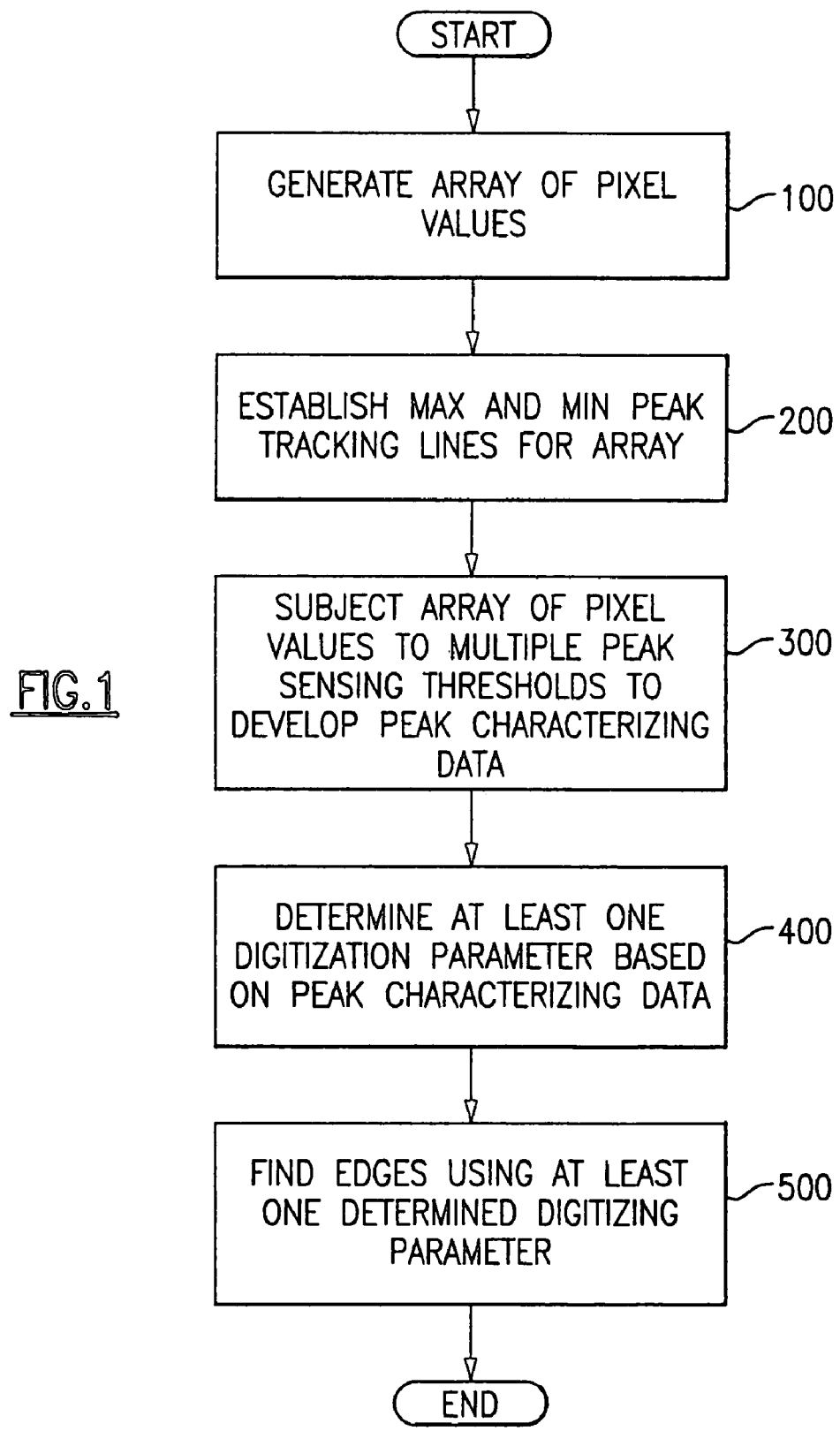
FIG. 1 is a flow diagram illustrating one embodiment of the invention.

Referring to the flow diagram of FIG. 1, the invention is an adaptive digitations method for execution by an optical reader. According to the invention, a set of image data is subjected to preliminary processing for determination of at least one digitization parameter which is then utilized for digitation of the set of image data. The digitization method therefore varies depending upon features of the image data presently being subjected to digitization.

At block 100 an optical reader according to the invention generates an array of multibit (more than one bit) pixel values. The pixel values may correspond to pixels of an image sensor or to samples of pixels from an image sensor. The pixels may be selected from a line of pixels of an image sensor. The line of pixels may comprise pixels from a single row or column of a 2D image sensor or a single row of pixels of a 1D image sensor. The array may also be generated by a reader having a laser scan engine based imaging system. The array may also comprise pixel values representing a diagonal line of pixels in a 2D image sensor and therefore may comprise pixel values of pixels from multiple columns and rows of a 2D image sensor. After generating an array of pixel values at block 100 a reader according to the invention at block 200 establishes max and min peak tracking lines for the array of pixel values. The max and min peak tracking lines track the maximum peaks and minimum peaks of the array of pixels.

At block 300 an optical reader according to the invention then subjects the array of pixel values to a preliminary processing routine which results in the development of peak characterizing data. In one particular embodiment, a reader at block 300 subjects an array of pixel values to iterative peak detection processing utilizing incrementally aggressive peak sensing thresholds. The reader stores data developed as a result of the iterative peak detection processing as peak characterizing data.

The incrementally aggressive peak sensing thresholds which the reader utilizes for peak detection at a particular pixel position of the array preferably depends upon the difference between the max and min peak tracking lines at the particular pixel position, as determined at the tracking line establishing step of block 200.

At block 400 a reader according to the invention determines at least one digitizing parameter based on the peak characterizing data. Utilizing the determined decoding peak sensing threshold and grey band positions, the reader at block 500 determines edge positions for the array of pixel values. If the symbol image representation is of sufficient quality, the message request by the array, of pixel values is then decoded.

Optical readers having image capture capability in which the invention can be employed are described with reference to FIGS. 2a–3e. Optical readers in which the invention can be employed are available in many different variations. Single state optical readers, commonly available in the physical form shown in FIGS. 2a–2d are programmed to carry out one basic function, such as decoding bar code symbols when a device trigger 13t is actuated. Multistate optical readers are optical readers that can be reprogrammed. Multistate optical readers commonly have a keyboard for entering in data and control instructions. However, multistate reprogrammable optical readers do not require a keyboard as explained in commonly assigned U.S. Pat. No. 5,965,863 incorporated herein by reference. A keyboardless optical reader can be made reprogrammable by configuring the reader so that the reader operating program changes when a menu symbol is decoded. A keyboardless optical reader can also be reprogrammed by transmitting an entire or partial operating program from a host processor system to an optical reader 10.

Figures 2A, 2B, 2C, 2D:
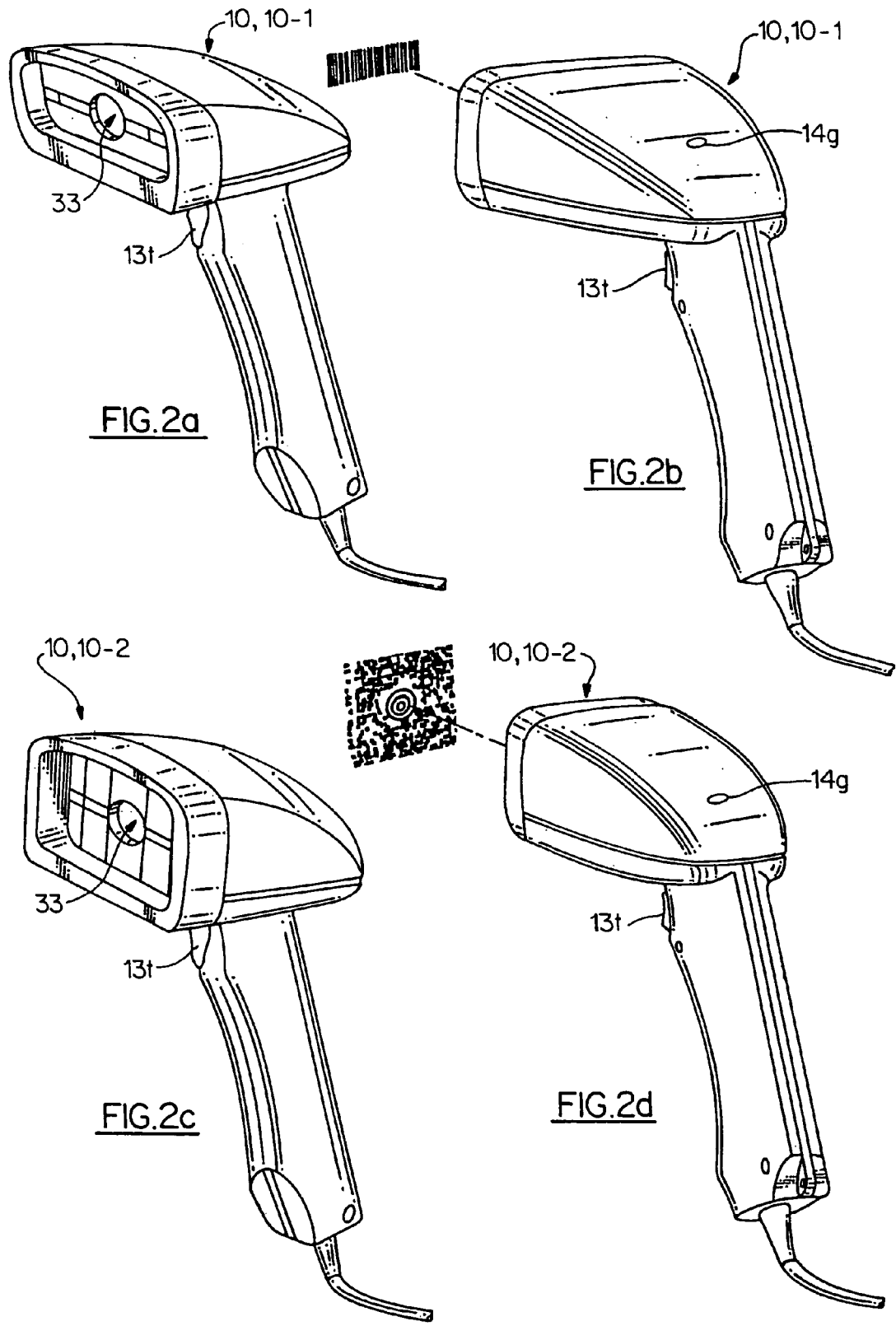
FIGS. 2a–2j illustrates various reader housings which may incorporate the invention.
Figure 2E:
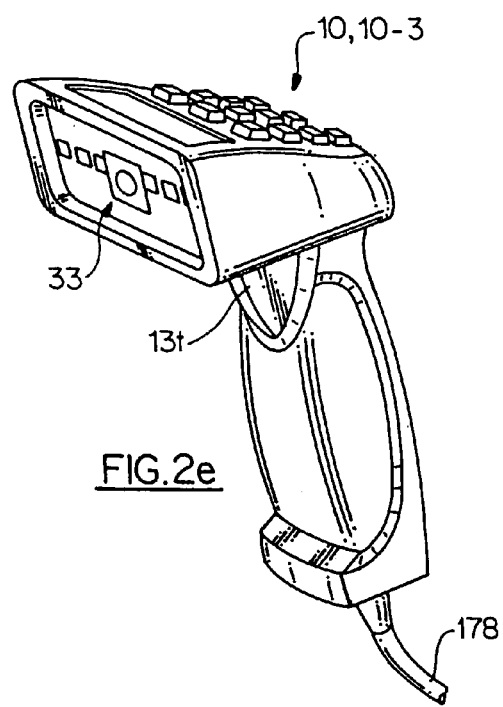
Figure 2F:
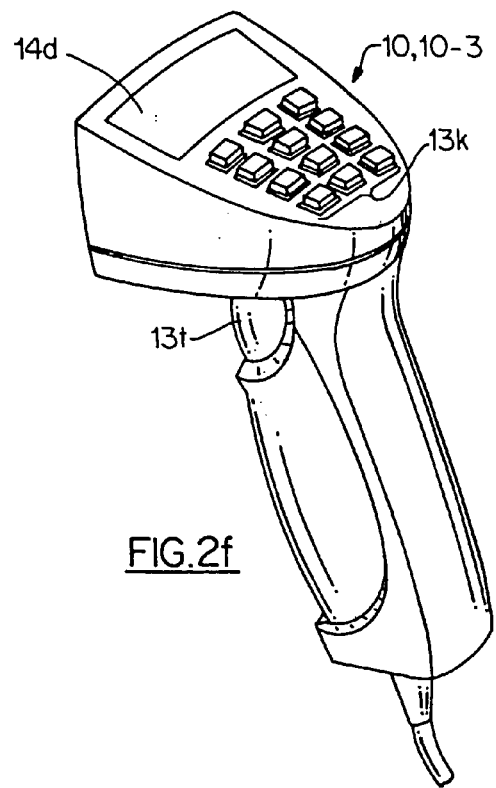
Figure 2G:
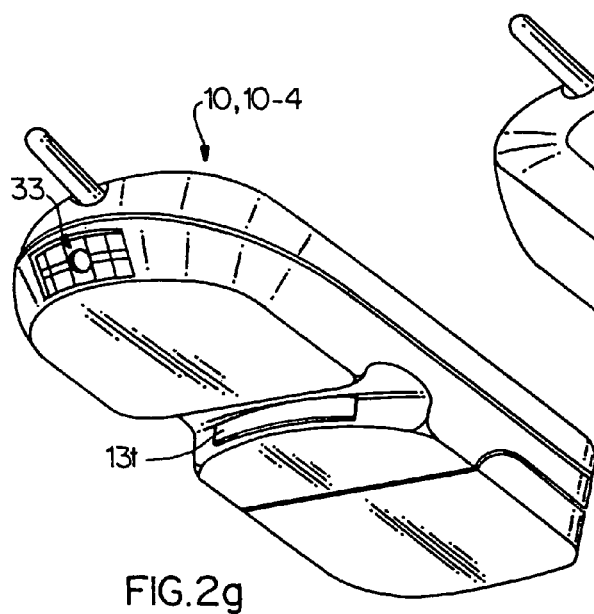
Figure 2H:
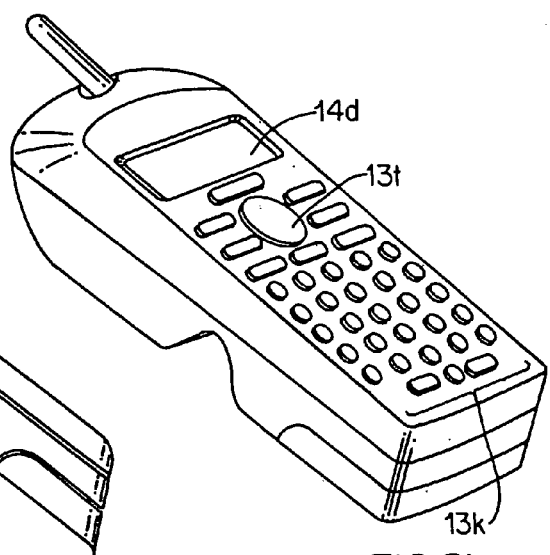
Figure 2I:
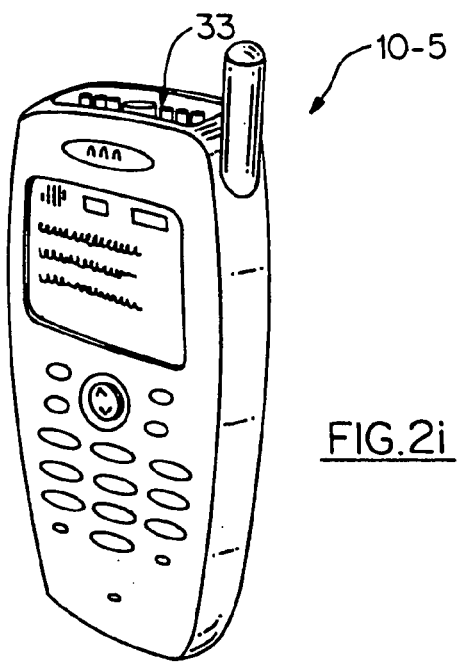
Figure 2J:
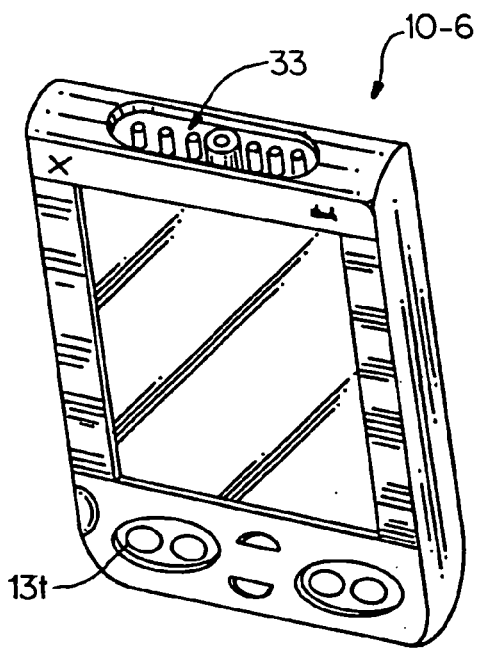

Examples of optical readers having advanced user inputs and outputs are shown in physical form in FIGS. 2e–2j. Readers 10-3 and 10-4 both have a keyboard 13K for inputting working and/or instructional data and a display 14 for displaying text and/or graphics. The processor systems of optical readers of the type having a keyboard and a display commonly have an operating system stored thereon, such as DOS or WINDOWS CE. An operating system allows a reader to execute programs written in high level programming languages, and allows a reader to execute commercially available application programs including spreadsheet type programs. Other housings for optical readers are shown in FIGS. 2i and 2j. Reader 10-5 is an optical reader having an imaging assembly 33 incorporating a cellular telephone transceiver while reader 10-6 is an optical reader having an imaging assembly 33 that is incorporated in a hand-held computer housing, known as a personal data assistant, or "PDA."

Figure 3A:
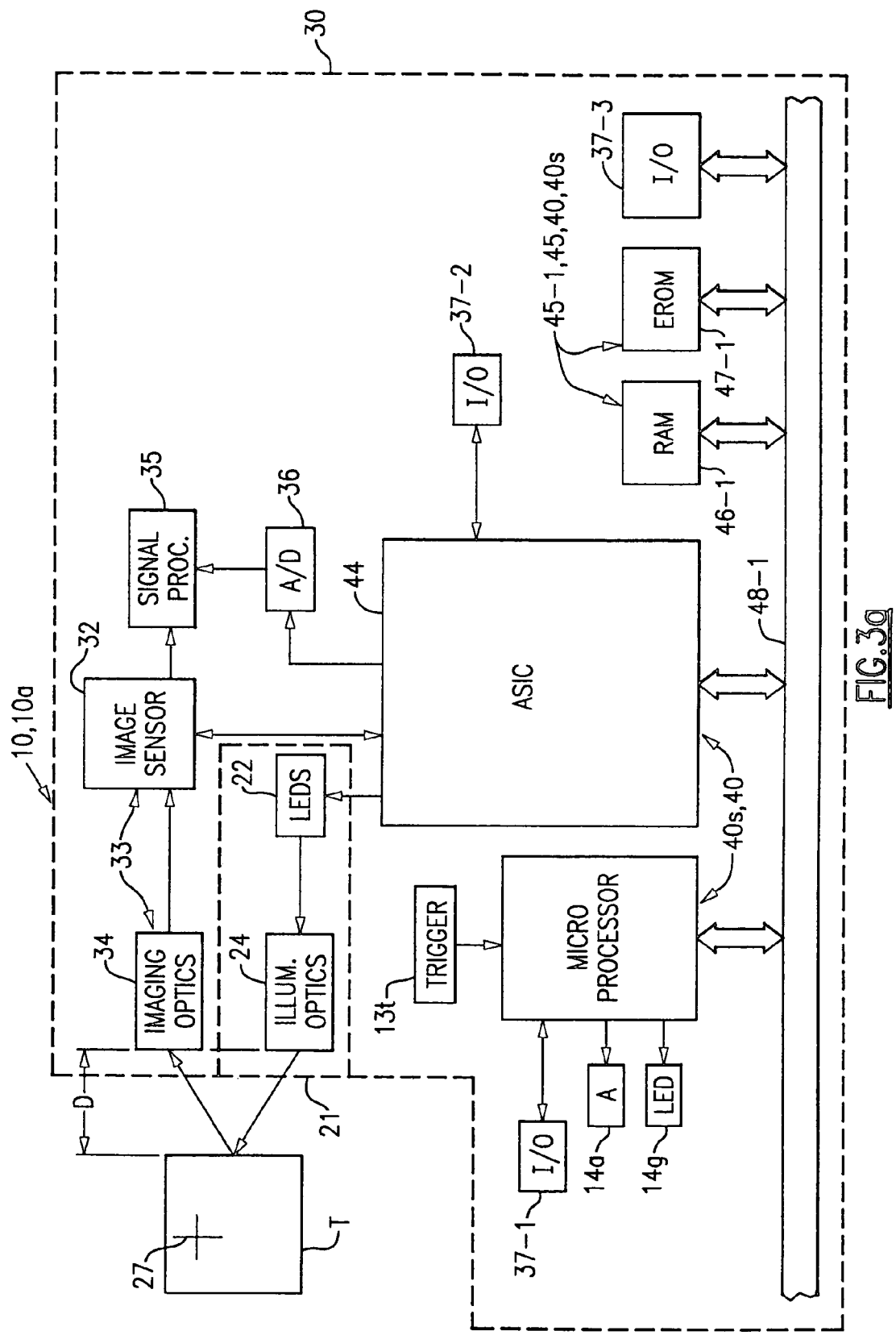
FIGS. 3a–3e illustrate alternative block diagrams for optical readers in which the invention may be incorporated.

Block diagrams illustrating various types of optical readers are shown in FIGS. 3a–3e. Referring to FIG. 3a, single state optical reader 10a includes a reader processor assembly 30, and an illumination system 31. Reader processor assembly 30 captures an image of image target T, decodes decodable symbols of the target to generate a message, and transmits the message to a host processor assembly to be described herein.

Reader processor system 30 of FIG. 3a also includes programmable control circuit 40s which preferably comprises an integrated circuit microprocessor 42 and an application specific integrated circuit (ASIC 44). The function of ASIC 44 could also be provided by field programmable gate array (FPGA). Processor 42 and ASIC 44 are both programmable control devices which are able to receive, output and process data in accordance with a stored program stored in memory unit 45-1 which may comprise such memory elements as a read/write random access memory or RAM 46-1 and an erasable read only memory or EROM 47-1. RAM 46-1 typically includes at least one volatile memory device but may include one or more long term non-volatile memory devices. Processor 42 and ASIC 44 are also both connected to a common bus 48-1 through which program data and working data, including address data, may be received and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor which has overall control of the circuitry of FIG. 2a, but which devotes most of its time to decoding decodable image data such as symbology or text character data stored in RAM 46-1 in accordance with program data stored in EROM 47-1. ASIC 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processor 42 and ASIC 44 will naturally depend on the type of off-the-shelf microprocessors that are available, the type of image sensor which is used, the rate at which image data is output by imaging assembly 33, etc. There is nothing in principle, however, that requires that any particular division of labor be made between processors 42 and 44, or even that such a division be made at all.

With processor architectures of the type shown in FIG. 3a, a typical division of labor between processor 42 and ASIC 44 will be as follows. Processor 42 is preferably devoted primarily to such tasks as decoding image data in response to trigger 13t being activated, once such data has been stored in RAM 46-1 and, recognizing characters represented in stored image data according to an optical character recognition (OCR) scheme in response to an actuation of trigger 13t.

ASIC 44 is preferably devoted primarily to controlling the image acquisition process, the A/D conversion process and the storage of image data, including the ability to access memories 46-1 and 47-1 via a DMA channel. ASIC 44 may also perform many timing and communication operations. ASIC 44 may, for example, control the illumination of LEDs 22, the timing of image sensor 32 and an analog-to-digital (A/D) converter 36-1, the transmission and reception of data to and from a processor system external to assembly 30, through an RS-232, a network such as an Ethernet, a serial bus such as USB, a wireless communication link (or other) compatible I/O interface as is indicated by interface 37-2. ASIC 44 may also control the outputting of user perceptible data via an output device, such as aural output device 14a, a good read LED 14g and/or a display monitor which may be provided by a liquid crystal display such as display 14d. Control of output, display and I/O functions may also be shared between processors 42 and 44, as suggested by bus driver I/O interface 37-3 or duplicated, as suggested by microprocessor serial I/O interface 37-1 and interface 37-2. As explained earlier, the specifics of this division of labor is of no significance to the present invention.

Figure 3B:
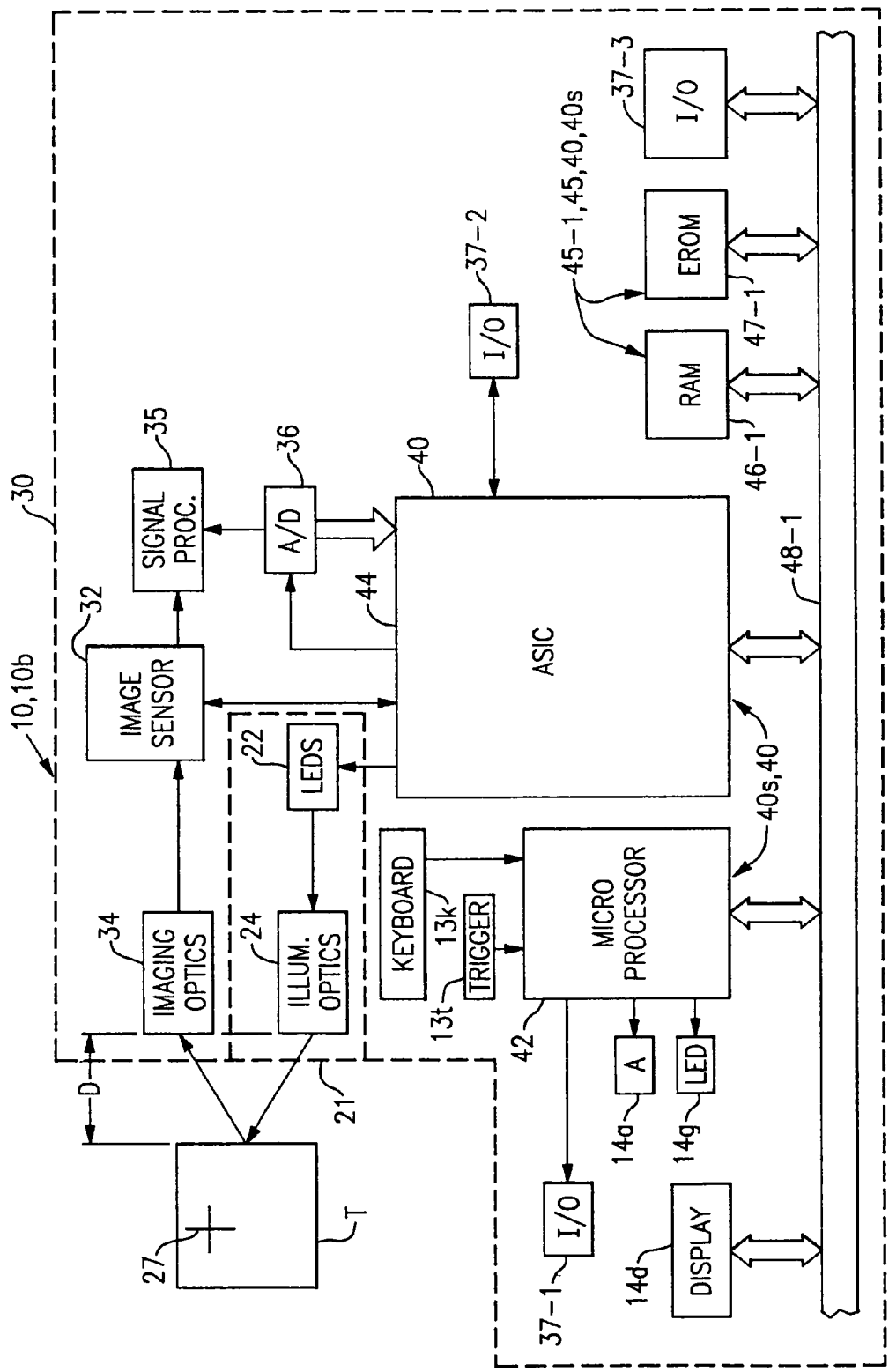

FIG. 3b shows a block diagram exemplary of an optical reader which is adapted to receive control instructions resulting in a change in an operating program of a reader. In addition to having the elements of single state reader circuit of FIG. 3a, reader 10b includes a keyboard 13k for inputting data including instructional data and a display 14d for displaying text and/or graphical information to an operator. Keyboard 13k may be connected to bus 48-1, ASIC 44 or to processor 42 as indicated in FIG. 2b. Display 14d may be connected to ASIC 44, to processor 42 or to system bus 48-1 as is indicated in the particular embodiment of FIG. 3b.

An operator operating optical reader 10b can reprogram reader 10b in a variety of three different ways. In one method for reprogramming reader 10-*b*, an operator actuates a control button of keyboard 13*k* which has been pre-configured to result in the reprogramming of reader 10*b*. In another method for reprogramming reader 10*b* an operator actuates control of a processor system not integral with reader 10*b* to transmit an instruction to reprogram reader 10*b*. According to another method for reprogramming reader 10*b*, an operator moves reader 10*b* so that a "menu symbol" is in the field of view of image sensor 32 and then activates trigger 13*t* of reader 10*b* to capture an image representation of the menu symbol. A menu symbol is a specially designed bar code symbol which, when read by an appropriately configured optical reader results in a reader being programmed. The reprogramming of an optical reader with use of a menu symbol is described in detail in commonly assigned U.S. Pat. No. 5,965,863 incorporated herein by reference. Because the second and third of the above methodologies do not require actuation of a reader control button of keyboard 13*k* but nevertheless result in a reader being reprogrammed, it is seen that reader may be keyboardless but nevertheless reprogrammable.

Figure 4A:
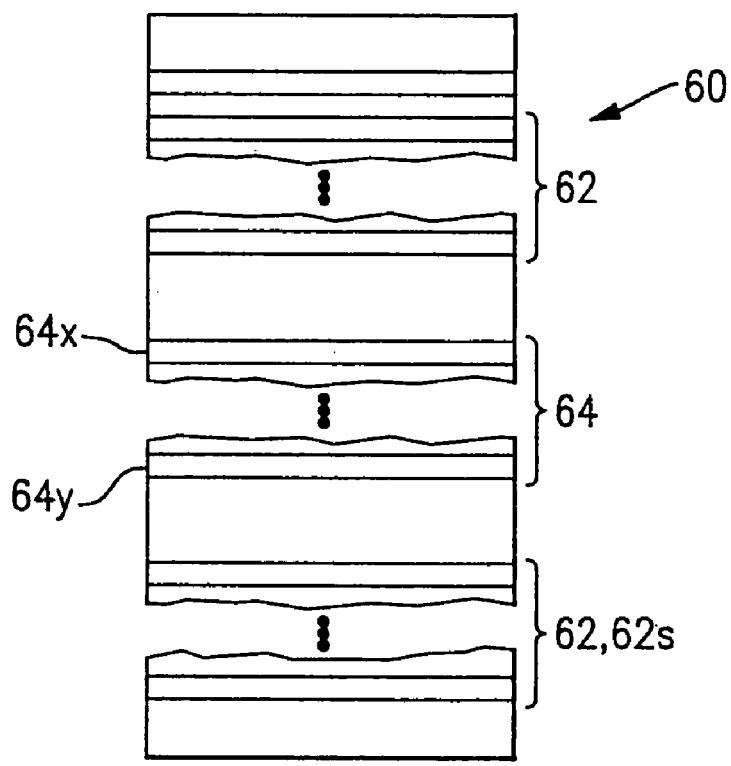
FIG. 4a illustrates a memory map of an optical reader according to the invention.

A typical software architecture for an application operating program typically executed by an optical reader as shown in FIG. 3*b* is shown in FIG. 4*a* depicting a memory map of a program stored in program memory 47-1. Application operating program 60 adapts a reader for a particular application. Three major applications for an optical reader imaging device having image capture capability are: (1) bar code symbology decoding; (2) optical character recognition; and (3) signature capture. In a bar code symbology decoding application, reader 10 may preliminarily analyze and then decode a message corresponding to a bar code symbol. In a character recognition application reader 10 may locate decodable OCR characters, then execute an OCR algorithm to decode the message corresponding to the OCR characters. In a signature capture application, reader 10 may capture an image corresponding to a scene having a signature, parse out from the image data that image data corresponding to a signature, and transmit the captured signature data to another processing system. It is seen that the third of such applications can be carried out by an optical reader imaging device that is not an optical reader decoder equipped with decoding capability. Numerous other application operating programs are, of course possible, including a specialized 1D decoding application, a specialized 2D bar code decoding algorithm, a hybrid bar code decoding, an OCR decoding application which operates to decode either decodable bar code symbols or OCR decodable text characters, depending on what is represented in a captured image.

Referring now to specific aspects of, the software architecture of operating program 60, operating program 60 includes an instruction section 62, and a parameter section 64. Further, instruction section 62 may include selectable routine section 62*s*. Instructions of instruction section 62 control the overall flow of operation of reader 10. Some instructions of instruction section 62 reference a parameter from a parameter table of parameter section 64. An instruction of instruction section 62 may state in pseudocode, for example, "Set illumination to level determined by [value in parameter row x]." When executing such an instruction of instruction section 62, control circuit 40 may read the value of parameter row 64*x*. An instruction of instruction section 62 may also cause to be executed a selectable routine, that is selected depending on the status of a parameter value of parameter section 64. For example, if the application program is a bar code decoding algorithm then an instruction of instruction section 62 may state in pseudocode, for example, "Launch Maxicode decoding if Maxicode parameter of parameter row 64*y* is set to "on." When executing such an instruction, control circuit 40 polls the contents of row 64*y* of parameter section 64 to determine whether to execute the routine called for by the instruction. If the parameter value indicates that the selectable routine is activated, control circuit 40, executes the appropriate instructions of routine instruction section 62*s* to execute the instruction routine.

It is seen, therefore, that the above described software architecture facilitates simplified reprogramming of reader 10. Reader 10 can be reprogrammed simply by changing a parameter of parameter section 64 of program 60, without changing the subroutine instruction section 62*s* or any other code of the instruction section 62 simply by changing a parameter of parameter section 64. The parameter of a parameter value of section 62 can be changed by appropriate user control entered via keyboard 13*k*, by reading a menu symbol configured to result in a change in parameter section 64, or by downloading a new parameter value or table via a processor system other than system 40-1. The reprogramming of reader 10*b* can of course also be accomplished by downloading an entire operating program including sections 62 and 64 from a processor system other than system 40-1.

Figure 3C:
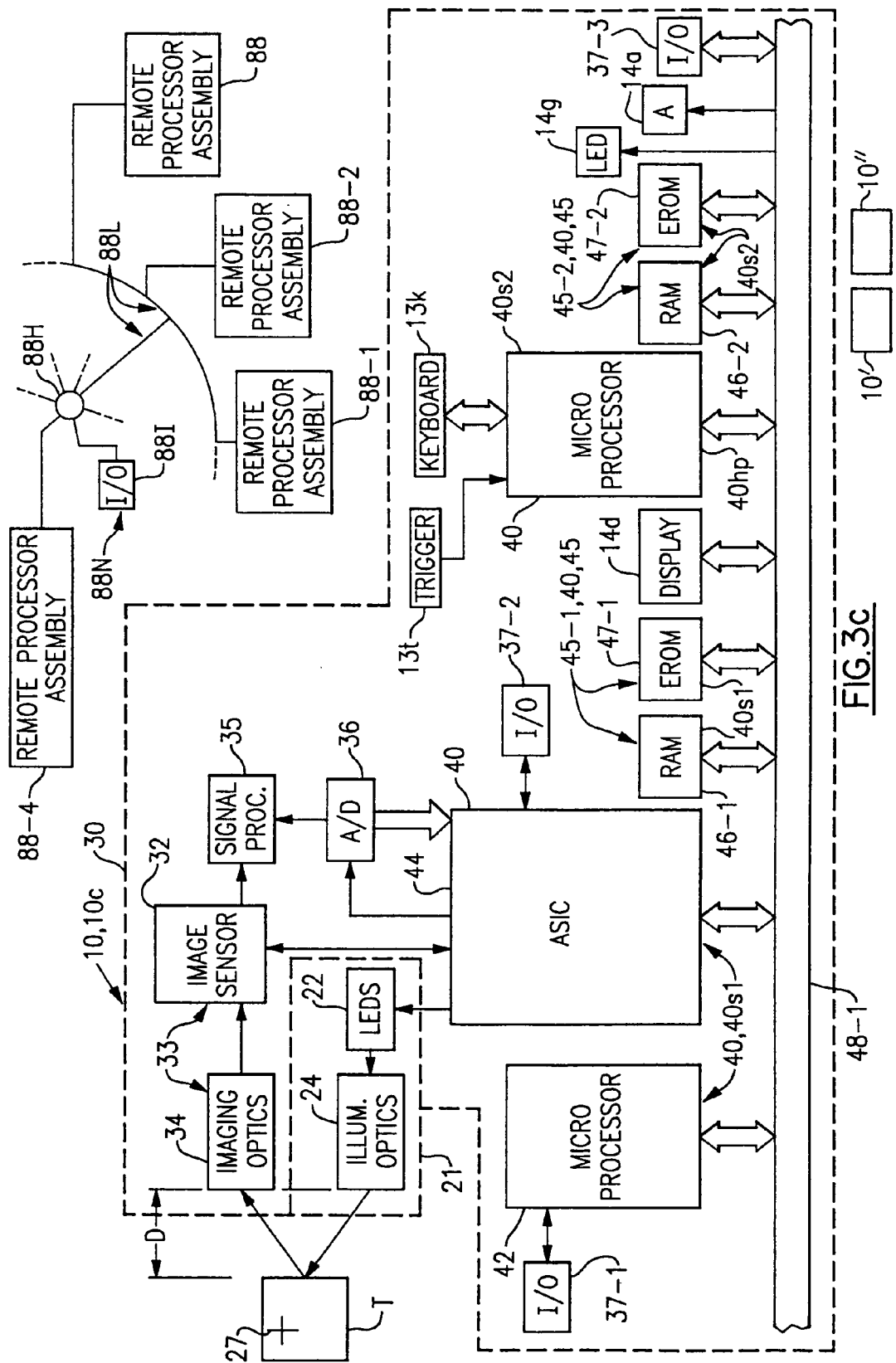

Another architecture typical of an optical reader is shown in FIG. 3*c*. Reader 10*c* includes processor system 40*s*1, and an integrated host processor system 40*s*2 which includes host processor 40*hp* and an associated memory 45-2. "Host processor system" herein shall refer to any processor system which stores a reader application operating program for transmission into a processor system controlling operation of a reader imaging system 33 or which exercises supervisory control over a processor system controlling operation of a reader imaging system 33, or which stores in its associated memory more than one application operating program that is immediately executable on reception of a command of a user. In a reader having two processors such as processor 42 and processor 40*hp*, processor 42 is typically dedicated to process an image data to decode decodable indicia, whereas processor 40*hp* is devoted to instructing processor 42 to execute decoding operations, receiving inputs from trigger 13*t* and keyboard 13*k*, coordinating display and other types of output by output devices 14*d*, 14*g*, and 14*a* and controlling transmissions of data between various processor systems.

In architectures shown in FIG. 3*c* having dedicated decoding processor system 40*s*1 and a powerful, supervisory host processor system 40*s*2, host processor system 40*s*2 commonly has stored thereon an operating system, such as DOS WINDOWS or WINDOWS, or an operating system specially tailored for portable devices such as, WINDOWS CE available from Microsoft, Inc. In the case that host processor system 40*s*2 includes an operating system such as DOS or WINDOWS CE, the instruction section and parameter section of the operating program controlling the operation of host processor system 40*s*2 normally are programmed in a high level programming language and assembled by an assembler before being stored in memory 47-2 and therefore may not reside in consecutive address locations as suggested by program 60 shown in FIG. 4*a*. Nevertheless, host processor system 40*s*2 having an operating system integrated thereon can readily assemble an operating program into such a form for loading into an external processor system that does not have an operating system stored thereon.

Referring to further aspects of readers 10*a*, 10*b*, and 10*c* at least one I/O interface e.g. interface 37-1, 37-2, and 37-3 facilitates local "wired" digital communication such as RS-232, Ethernet, serial bus including Universal Serial Bus (USB), or local wireless communication technology including "Blue Tooth" communication technology. At least one I/O interface, e.g. interface 37-3, meanwhile, facilitates digital communication with remote processor system 41-1 in one of available remote communication technologies including dial-up, ISDN, DSL, cellular or other RF, and cable. Remote processor assembly 88-1 may be part of a network 88N of processor systems as suggested by assemblies 88-2, 88-3, and 88-4 links 88L and hub 88H e.g. a personal computer or main frame computer connected to a network, or a computer that is in communication with reader 10c only and is not part of a network. The network 88N to which system 88-1 belongs may be part of the internet. Further, assembly 88-1 may be a server of the network and may incorporate web pages for viewing by the remaining processor assemblies of the network. In addition to being in communication with reader 10c, system 88-1 may be in communication with a plurality of additional readers 10' and 10." Reader 10c may be part of a local area network (LAN). Reader 10 may communicate with system 88-1 via an I/O interface associated with system 88-1 or via an I/O interface 88I of network 88N such as a bridge or router. While the components of readers 10a, 10b, and 10c are represented in FIGS. 3a–3c as discrete elements it is understood that integration technologies have made it possible to form numerous circuit components on a single integrated circuit chip. For example, with present fabrication technologies, it is common to form components such as components 42, 40, 46-1, 47-1, 37-2, and 37-1 on a single piece of silicone.

Furthermore, the number of processors of reader 10 is normally of no fundamental significance to the present invention. In fact if processor 42 is made fast enough and powerful enough special purpose ASIC processor 44 can be eliminated. Likewise referring to reader 10c a single fast and powerful processor can be provided to carry out all of the functions contemplated by processors 40hp, 42, and 44 as is indicated by the architecture of reader 10e of FIG. 3e. Still further, it is understood that if reader 10 includes multiple processors the processors may communicate via parallel data transfers rather than via the serial communication protocol indicated by serial buses 48-1 and 48-2. In addition, there is no requirement of a one-to-one correspondence between processors and memory. Processors 42 and 40hp shown in FIG. 3c could share the same memory, e.g. memory 45-1. A single memory e.g. memory 45-1 service multiple processors e.g. processor 42 and processor 40 hp.

Figure 3D:
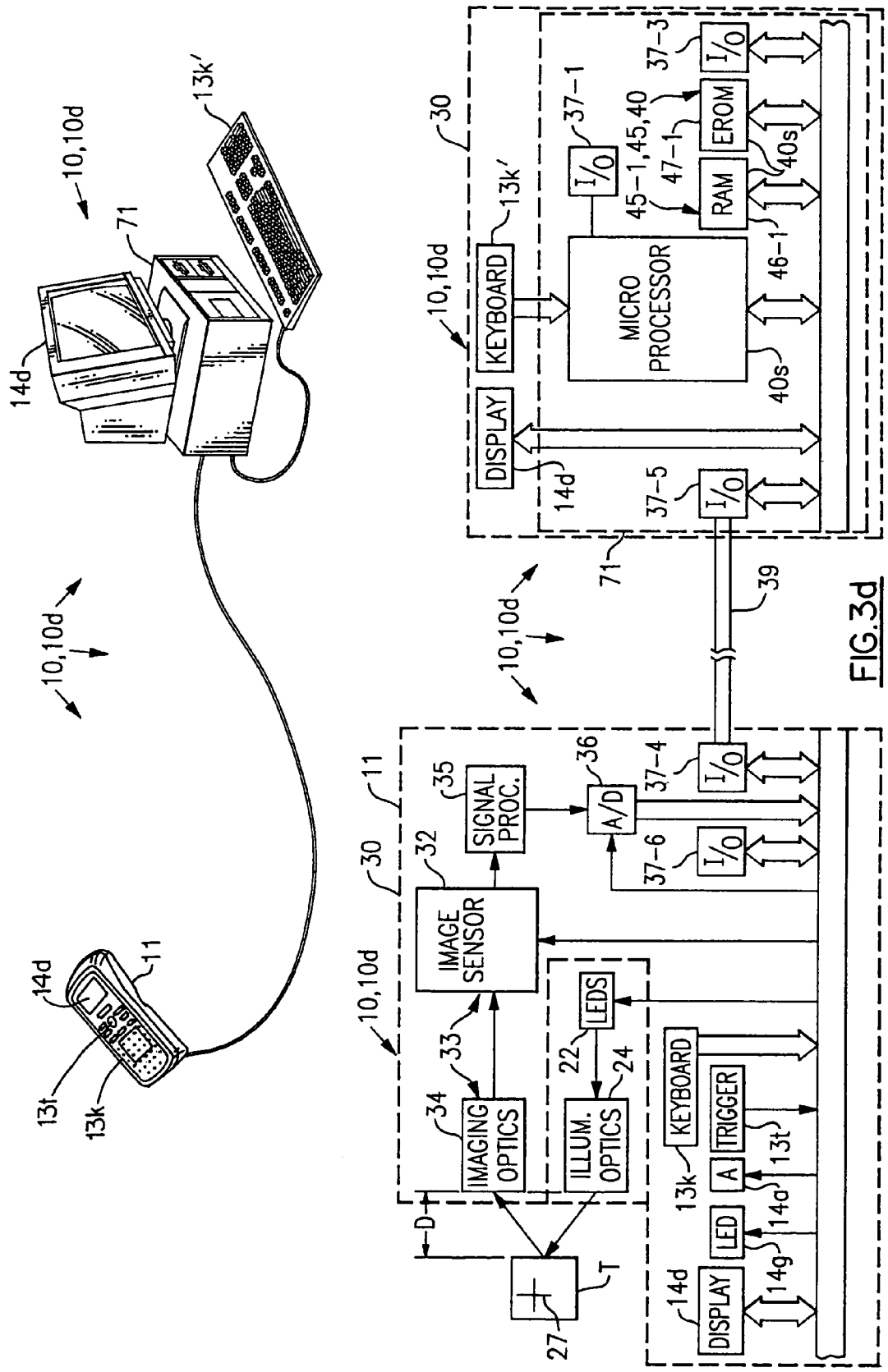

Referring to the embodiment of FIG. 3d, it is seen that it is not necessary that the entirety of electrical components of an optical reader 10 be incorporated in a portable device housing 11. The electrical components of reader 10-4 are spread out over more than one circuit boards that are incorporated into separate device housings 11 and 71. It is understood that circuitry could be spread out into additional housings. Control circuit 40 in the embodiment of FIG. 3d is incorporated entirely in the housing 71 that is nonintegral with portable device housing 11. Housing 71 is shown as being provided by a personal computer housing, but could also be provided by another type of housing such as a cash register housing, a transaction terminal housing or a housing of another portable device such as housing 11. At least one operating program for controlling imaging assembly 33 and for processing image signals generated from imaging assembly 33 is stored in EROM 47-1 located within PC housing 71. For facilitating processing of signals generated from imaging assembly 33 by a processor system that is not integrated into portable housing 11 a high speed data communication link should be established between imaging assembly 33 and processor system. In the embodiment of FIG. 3d, I/O interfaces 37-4 and 37-5 and communication link 39 may be configured to operate according to the USB data communication protocol. The configuration shown in FIG. 3d reduces the cost, weight, and size requirements of the portable components of reader 10d, which in reader 10-4 are the components housed within portable housing 11. Because the configuration of FIG. 3d results in fewer components being incorporated in the portable section of reader 10-4 that are susceptible to damage, the configuration enhances the durability of the portable section of reader 10-4 delimited by housing 11.

Figure 3E:
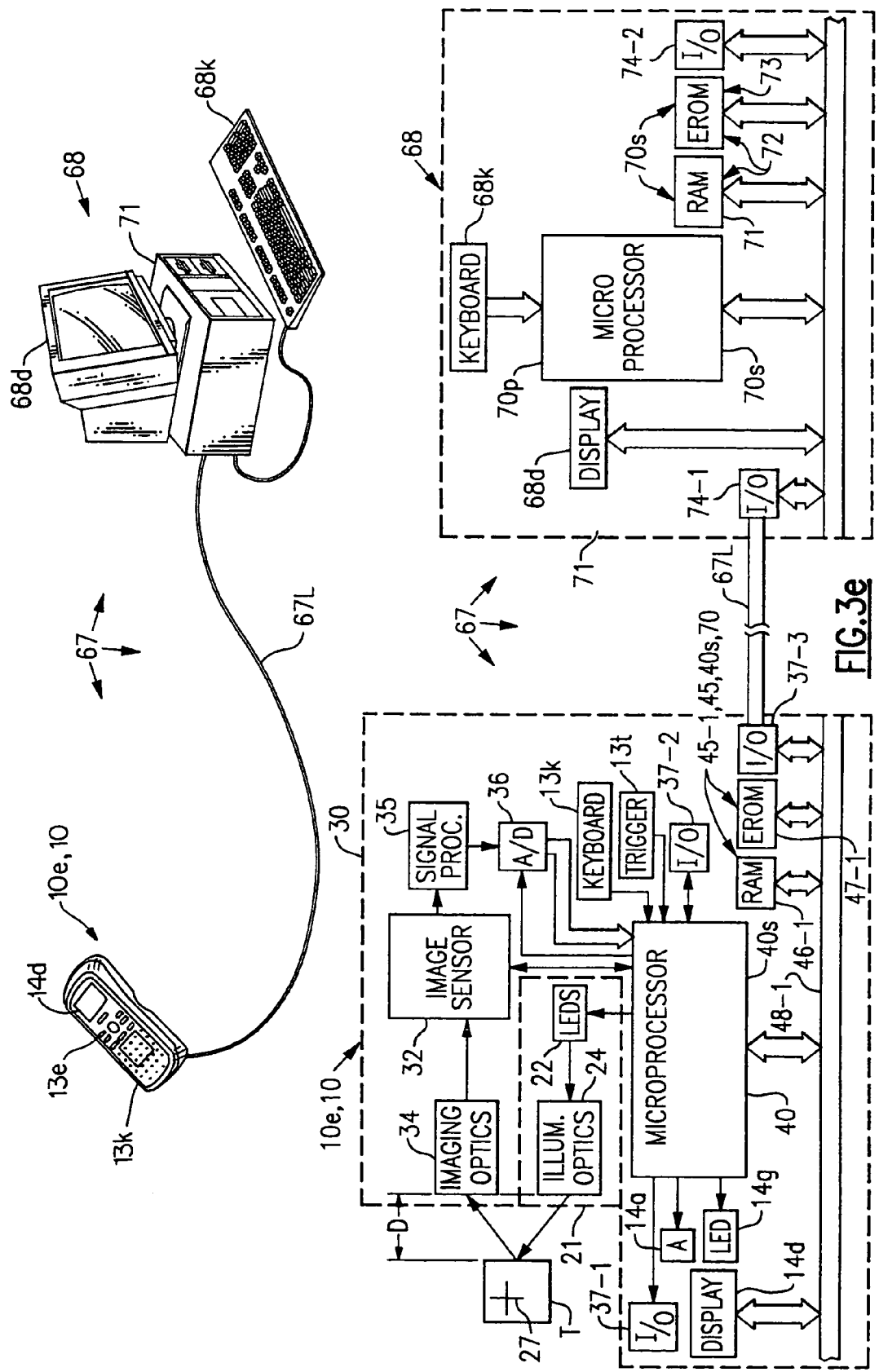

The reader communication system of FIG. 3e has a physical layout identical to reader 10d, but is optimized for a different operation. System 67 is a communication system in which reader processor system 40s communicated with a nonintegrated local host processor system 70s provided by a personal computer 68 having a PC housing 71, a keyboard 68d, a mouse 68, and a display 68d. Provided that link 67L is a high speed communication link, nonintegrated local host processor system 70s could be programmed to provide functioning identical to processor system 40s of reader 10d. However, because reader 10e comprises an integrated processor system 40s such programming is normally unnecessary, although as described in copending application Ser. No. 09/385,597 it is useful to configure processor system 40s so that certain components of reader 10 such as trigger 13t can be controlled remotely by host processor system, which in one embodiment is nonintegrated. Accordingly in reader-host communication systems as shown in FIG. 3e nonintegrated host processor assembly 68 typically is programmed to provide functions separate from those of the reader processor systems described in connection with FIGS. 3a–3d.

As described in U.S. Pat. No. 5,965,863, incorporated herein by reference, one function typically provided by nonintegrated local host processor system 70s is to create operating programs for downloading into reader 10. Processor system 70s typically has an operating system incorporated therein, such as WINDOWS, which enables an operator to develop operating programs using a graphical user interface. Nonintegrated local processor system 70s also can be configured to receive messages an/or image data from more than one reader, possibly in a keyboard wedge configuration as described in U.S. Pat. No. 6,161,760, incorporated herein by reference. It is also convenient to employ processor processing. For example a spreadsheet program can be incorporated in system 70s which is useful for analyzing data messages from reader 10e. An image processing application can be loaded into system 70s which is useful for editing, storing, or viewing electronic images received from reader 10e. It is also convenient to configure reader 10e to coordinate communication of data to and from remote processor assembly 88-1. Accordingly processor assembly 68 typically includes I/O interface 74-2 which facilitates remote digital communication with a remote processor assembly, e.g. assembly 88-1 as shown in FIG. 3c.

Referring now to aspect of the invention in further detail with reference again to FIG. 1 it has been mentioned that control circuit 40 at block 100 generates a pixel array of multibit pixel values. In the case that image sensor 32 is a monochrome image sensor these multibit pixel values are often referred to as "grey scale pixel" values. Typically the grey scale pixel values are 8 bits in length and range in binary value from binary 0 (00000000) to binary 255 (11111111).

Figure 5A:
FIGS. 5a–5e illustrate image maps from which arrays of pixel values according to the invention can be generated.

In one embodiment of the invention, image sensor 32 is a 1D image sensor comprising a single row of pixels and the array of pixel values generated at block 100 comprises one pixel value corresponding to each pixel value of image sensor 32. The embodiment in which the array of pixel values generated at block 100 corresponds to a complete row of pixels of a linear pixel array is expressed in FIG. 5a showing a 1D image map, wherein pixel positions represented in the array of pixel values are designated by dots d.

Figure 5B:
Figure 5C:
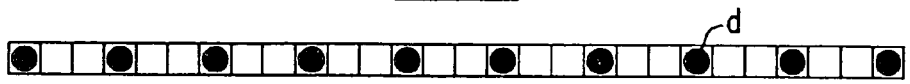

Alternative embodiments of the array of pixel values which control circuit 40 may generate at block 100 are indicated with references to FIGS. 5b–5e. FIGS. 5a–5b show additional image maps in which pixel positions represented in the generated array of pixel values are highlighted by dots d. The image map of FIG. 5b illustrates that the generated array of pixel values need not comprise pixel values of an entire row of pixels of a linear pixel array. The image map of FIG. 5c illustrates that the pixel positions represented in the generated array of pixel values need not comprise positionally contiguous pixels, but rather may comprise a sampling of pixels from a pixel row of a linear image sensor. For example, the array may comprise pixel values corresponding to every third pixel of sensor 32. Of course, as is well known, arrays of pixel values as shown in FIGS. 5a, 5b, and 5c can readily be generated by optical readers having laser scan engine based imaging systems.

Figure 5D:
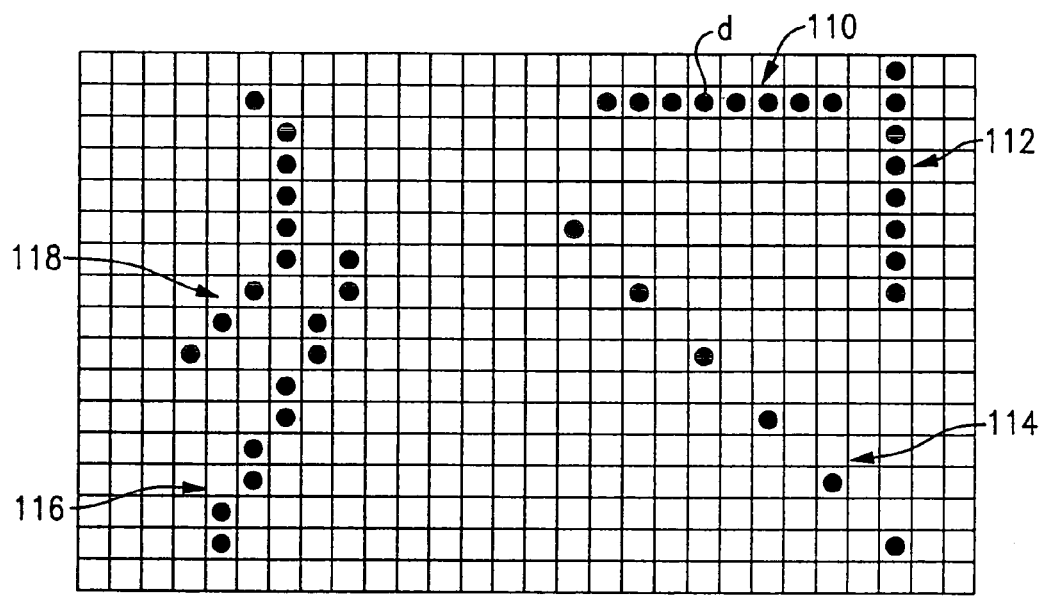
Figure 5E:
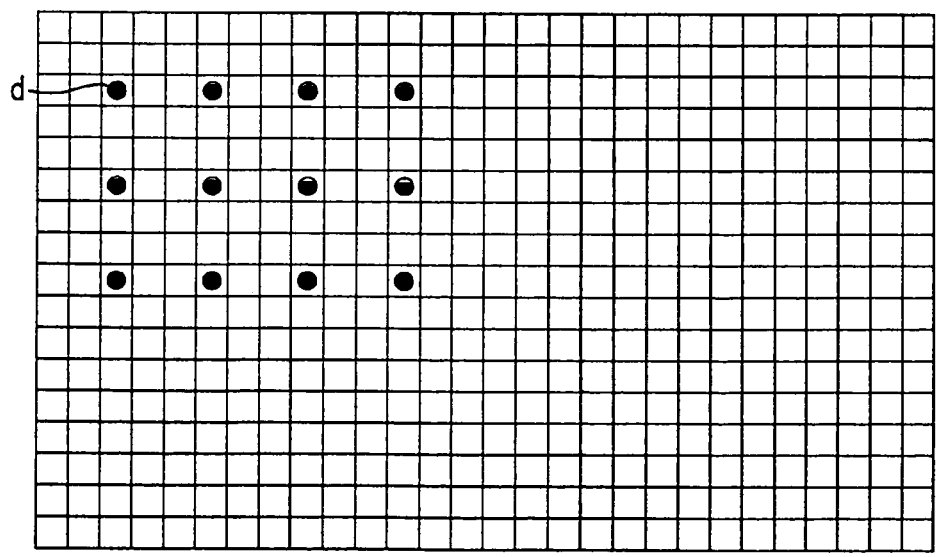

FIG. 5d shows examples of arrays of pixel values of the invention storable in memory 45 in the case that image sensor 32 is a 2D image sensor. An array of pixel values comprising the pixels of line 110 illustrates that pixel positions of an array of pixel values generated at block 100 can comprise pixels from a single row of pixels. Line 112 illustrates that the pixels of the generated array of pixel values can comprise pixel values corresponding to a single column of pixels of image sensor 32. Lines 114 and 116 illustrates that the pixel positions represented by the array of pixel values generated at block 100 can comprise pixel positions corresponding to multiple rows and columns of sensor 32. Line 114 further illustrates that pixel positions represented by the array of pixel values generated at block 100 may be positionally discontinuous. Line 118 indicates that the pixels of an array of pixel values may form a curved pattern. Referring to the image map of FIG. 5e, dots d indicate that the array of pixel values generated at block 100 may correspond to a sampling of pixels throughout an image map. Importantly, the image map from which the pixel values of the array of pixel values is generated may comprise or partially comprise a greater number of pixel values per unit scene area than image sensor 32. A method for interpolating constructed pixel values from pixel values of a first image map is described in commonly assigned copending application Ser. No. 09/615,505 filed Jul. 13, 2000, incorporated herein by reference. Actual image maps in actual implementations of the invention will normally have much higher resolutions than the maps shown in FIGS. 5a–5e.

Figure 6A:
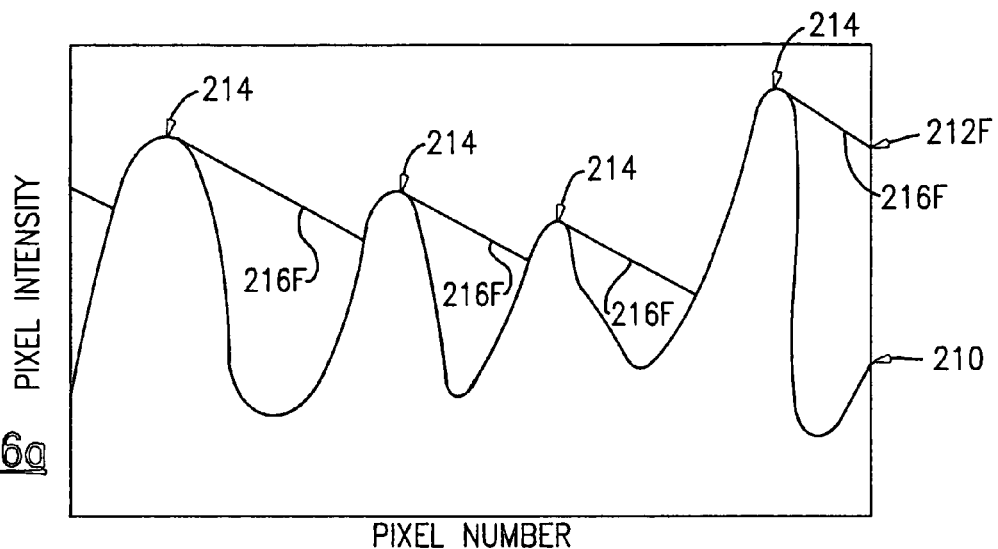
FIGS. 6a–6c illustrate a method for establishing peak tracking lines.
Figure 6B:
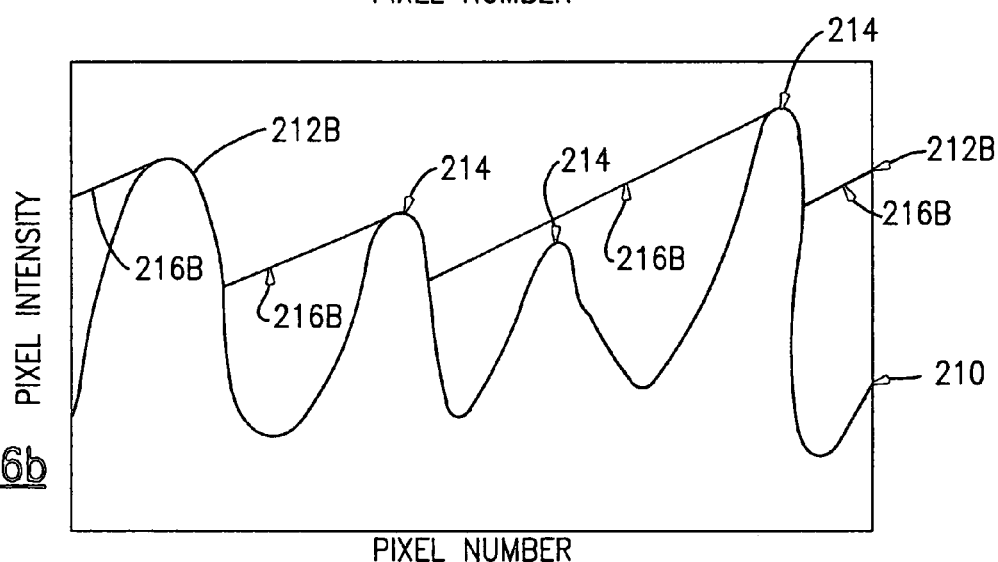
Figure 6C:
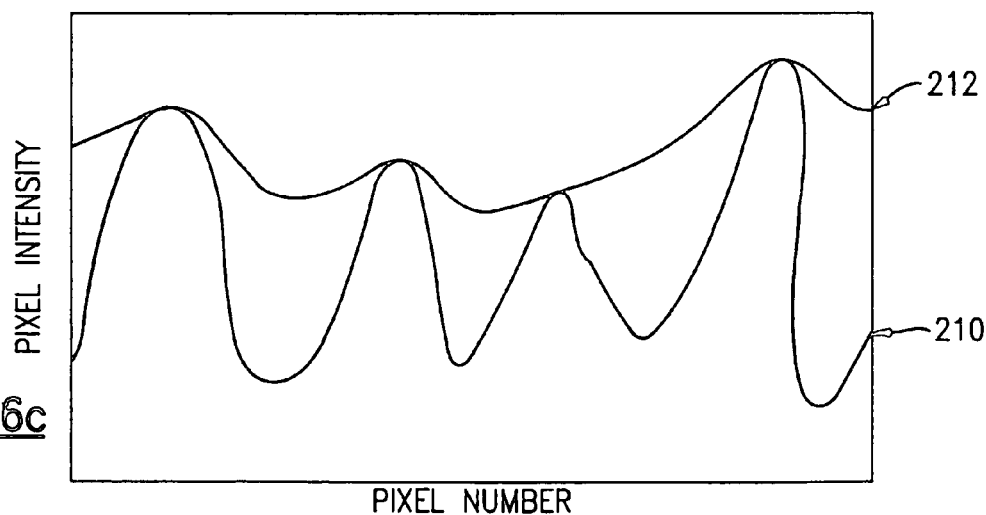

Referring again to the flow diagram of FIG. 1, control circuit 40 at block 200 establishes max and min peak tracking lines. A method for establishing array peak tracking lines such that the tracking lines are not heavily influenced by noise is described with reference to FIGS. 6a–6c. FIGS. 6a–6c show an array of pixel values 210 plotted in graph form. FIG. 6a illustrates a first step in establishing a max peak tracking line. Control circuit 40 can be configured to establish a forward direction max peak tracking line 212F such that forward peak tracking line 212F rises with the leading edge of max peaks 214 as seen in the forward direction and falls according to a predetermined or adaptively determined "droop" factor at the falling edge of peak as indicated by forward droop regions 216F. Likewise, control circuit 40 can be configured to construct a backward direction peak tracking line 212b such that backward direction peak tracking line 216B rises with the leading edge of peaks 214 as seen from the reverse direction and falls according to a predetermined (or adaptively determined) "droop" factor at the falling edge of peaks as is indicated by backward droop regions 216B. As is indicated by FIG. 6c control circuit 40 may construct a max peak tracking line 212 by compositioning the forward max peak tracking line 212F and backward max peak tracking line 212B, typically by averaging tracking lines 212F and 212B. It can be seen that control circuit 40 can construct a min peak tracking line following the same method.

Figure 7G:
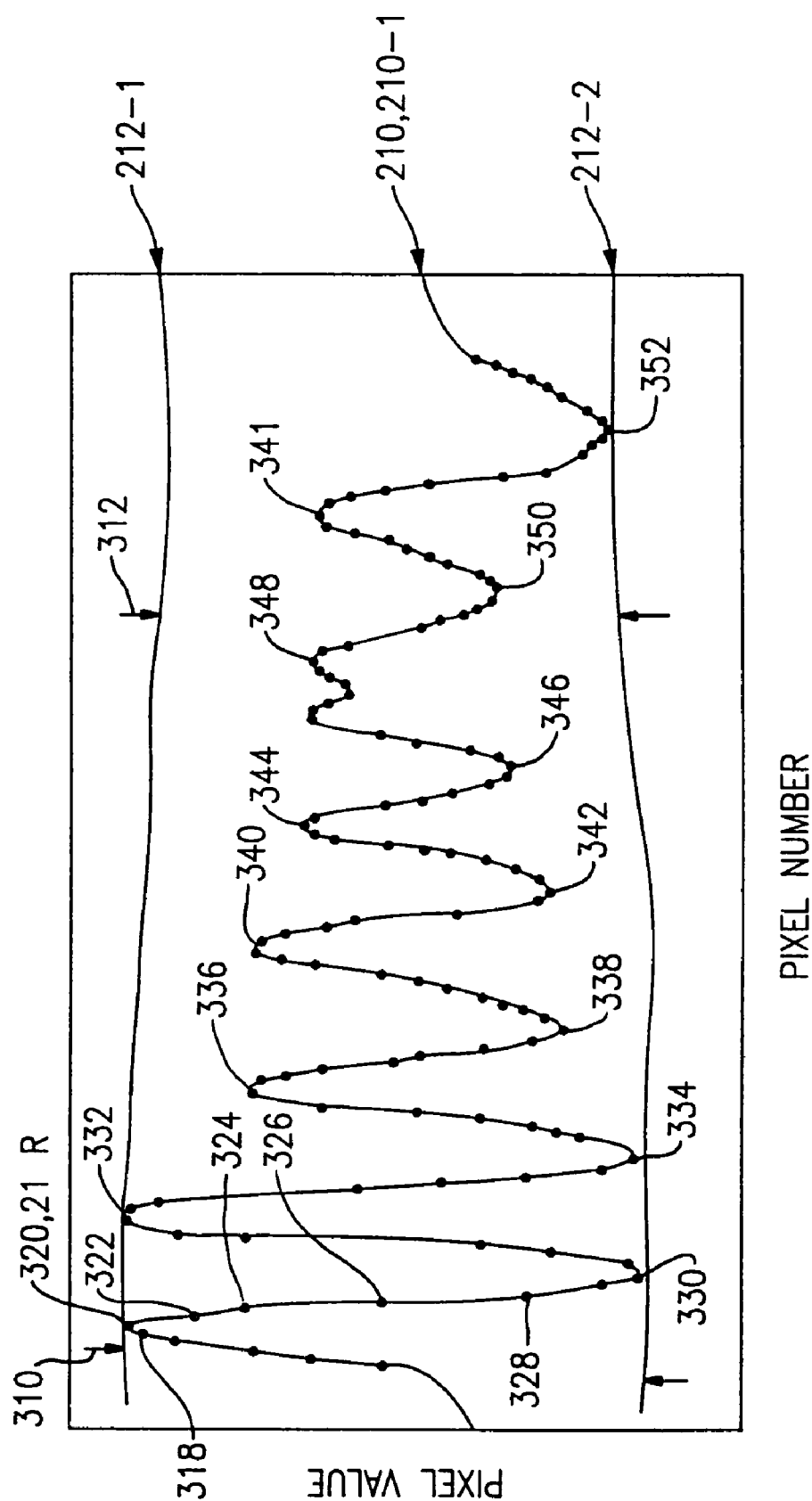
FIG. 7a is an example of an array pixel values graphical form.

Referring again to the main flow diagram of FIG. 1, having developed peak tracking lines at block 200, control circuit 40 at block 300 develops peak characterizing data characterizing peaks 214 and 215 of an array of pixel values. An exemplary method for developing such peak characterizing data is described with reference to FIG. 7a. FIG. 7a shows an illustrative array of pixel values 210-1 in graphical form, a max peak tracking line 212-1 and a min peak tracking line 213-1. In an exemplary peak characterizing routine according to the invention, control circuit 40 iteratively subjects an array of pixel values 210 to incrementally aggressive data developing peak sensing thresholds.

A peak sensing threshold is a threshold value used to sense whether an array 210 includes a peak. In an exemplary embodiment of the invention, peak sensing thresholds may be values defining a certain percentage of the difference between the max and min tracking lines 212-1 and 212-2. Thus the peak sensing threshold may depend on the pixel position of a peak. At position 310 in the example of FIG. 7a the difference between the max and min peak tracking lines is 100 levels of the binary scale. At position 312 the difference between the max and min peak tracking lines is 90 levels of the binary scale. In the alternative, block 200 (establish max and min peak tracking lines) could be avoided altogether and control circuit 40 at block 300 may relatively subject array 210 to peak sensing thresholds which comprise a predetermined number of levels of a binary scale. For example, control circuit 40 may first subject array 210 to peak detection using a peak sensing threshold of 50 binary levels, then 25, then 12 and so on. The method wherein the thresholds are determined as percentage values of the difference between max and min peak tracking lines while requiring additional processing time, normally yields higher digitization accuracy.

In a first step of a routine for developing peak characterizing data, referring to the example of FIG. 7a, control circuit 40 senses for peaks in array 210-1 using a 50% peak sensing threshold. At position 310 the 50% peak sensing threshold is (0.5×100)=50 levels of the binary scale. At position 312 the 50% peak sensing threshold is (0.5×90)=45 levels of the binary scale. Control circuit 40 recognizes a putative max peak pixel value when a succession of pixel values rises and then falls. Thus, control circuit 40 recognizes pixel value 320 as a putative peak pixel value after reading the succession of pixel values 318, 320 and 322. Control circuit 40 records a pixel value as a recorded max peak pixel value 212R when a succession of pixel values rises and then falls and then continues to fall until it reaches a value below a value determined by the peak sensing threshold level. Thus, using a peak sensing threshold of 50%, control circuit 40 records pixel value 320 as a recorded peak pixel value 212R after reading the succession of pixel values 318, 320, 322, 324, 326 and 328. Pixel value 328 is more than 50 levels below the level of pixel value 320. Subjecting array 210-1 to the 50% peak sensing threshold level, control circuit 40 records pixel values 320, 330, 332, 334, 336, 338, 340 and 341 as recorded peaks, but does not record other peak pixel values e.g. peak 342 recorded as peaks even though these peaks would have been recorded as peaks using a lower peak sensing threshold.

During the course of subjecting array 210-1 to peak detection using a particular peak sensing threshold, control circuit 40 assembles certain data resulting from application of the threshold. Specifically, control circuit 40 records the number of recorded peaks, N, and records a PEAKLEVEL value recorded using the peak sensing threshold. The PEAKLEVEL value can be selected to be the value of the highest new peak sensed by application of the present peak sensing threshold. The PEAKLEVEL value may also be calculated by averaging a plurality and perhaps all recorded peak values recorded during application of the present peak sensing threshold. The PEAKLEVEL value is typically recorded as a percentage of max peak tracking line 212. In applying a 50% peak sensing threshold to array 210-1, control circuit 40 records max peak pixel values 320, 332, 336, and 340 and min peak pixel values 328, 330, 334, and 338 as recorded peak pixel values of array 210-1. The highest max peak of array 7a detected with a 50% peak sensing threshold is peak 332. This peak is at 100% of the max peak tracking line 221. The data developed by application of a 50% peak sensing threshold 15 given by Table 1.

TABLE 1

| Threshold | Number of Peaks, N | PEAKLEVEL |
|---|---|---|
| 50% | 7 | 100% |

After developing shape characterizing data using a first peak sensing threshold (e.g., 50%) control circuit 40 develops additional peak characterizing data using a second, more aggressive peak sensing threshold, e.g., 25%. Since it is selected to be smaller than the first, the second peak sensing level will by definition sense all of the peaks sensed using the first threshold. Accordingly, control circuit 40 can be configured to avoid applying the second peak sensing threshold to peaks already sensed using the first peak sensing threshold. During the course of subjecting an array 210 to a second peak sensing threshold, control circuit 40 records data similar to that recorded during the course of sensing peaks using the first peak sensing threshold, except that instead of recording all of the peaks which would be detected by subjecting entire array 210-1 to the threshold, control circuit 40 records only the "new" peaks sensed using the second seeing threshold. Similarly, the PEAKLEVEL value recorded during the course of applying a second threshold to array 210-1 is made to correspond to the maximum "new" peak sensed using the second threshold. Applying a second, 25% peak sensing threshold in the example of FIG. 7a, peak pixel values 342, 344, 346, 348, 350, and 352 are recorded as new recorded peaks of array 210-1, and the PEAKLEVEL value, calculated as the percent value of peak pixel value 344 is 68%. The data resulting from application of the second peak second threshold is, therefore; as shown in Table 2.

TABLE 2

| Threshold | Number of Peaks, N | PEAKLEVEL |
|---|---|---|
| 25% | 6 | 68% |

After developing peak characterizing data applying a second peak sensing threshold, control circuit 40 may apply a third, a fourth, and possibly additional peak sensing thresholds to array 210-1, and record the peak characterizing data resulting from application of the thresholds. The peak characterizing data developed from application of the multiple peak sensing thresholds is conveniently expressed in matrix form, as is indicated herein.

With reference again to the flow diagram of FIG. 1, control circuit 40 at block 400 determines at least one digitization parameter based on the peak characterizing data developed at block 300. In an exemplary embodiment of the invention, control circuit at block 400 determines a plurality of digitization parameters, namely a digitizing peak sensing level and digitization "grey band" position parameters based on the peak characterizing data.

A set of rules for establishing a digitizing peak sensing level based on a set of peak characterizing data is as follows:
(I). If a present data developing peak sensing threshold yields no new peaks, establish the previous data developing peak sensing threshold as the digitization peak sensing threshold.
(II). If the summation of all peaks sensed after application of a present data developing peak sensing threshold yields at least a predetermined super majority percentage (such as 90%) of the total number of peaks detected by application all data developing thresholds, establish the present data developing peak sensing threshold as the digitization peak sensing threshold. However, Rule II is superceded if Rule III, herein below, applies.
(III). If the PEAKLEVEL value decreases down a row of a peak characterizing data matrix and then increases (or increases then decreases if the PEAKLEVEL records low peak values), establish the data developing peak sensing threshold from the row prior to the row at which the PEAKLEVEL value increases as the digitization peak sensing threshold.

Rule I was determined experimentally. It was found experimentally that if a given threshold yields no peaks, then peaks sensed by subsequent thresholds are mainly attributable to noise. Rule II was also determined experimentally. It was found that if aggressive thresholds yield a small percentage of the total number of peaks, those peaks sensed by the aggressive thresholds are substantially attributable to noise. Rule III is based on the observation that "minor" peaks occurring in a transition region (center region) of an array of pixel values are more likely to be attributable to bar space transitions than are "minor" peaks proximate tracking lines 212 and 213, as is discussed in connection with FIG. 8a. In the case the PEAKLEVEL value falls and then rises, the rising of the PEAKLEVEL with more aggressive thresholds indicates the presence of minor peaks proximate peak tracking lines 212 and 213. As discussed in connection with FIG. 8a minor peaks proximate tracking lines 212 and 213 and are likely to be attributable to noise. It can be seen that subsequent peak characterizing thresholding can be aborted if it is determined that Rule I applies.

In addition to determining a digitization peak sensing threshold based on the developed shape characterizing data, control circuit at block 400 may determine a digitization "grey band" position based on the peak characterizing data. A brief explanation of "grey banding" is provided herein with reference to FIG. 8a illustrating a "noisy" array of pixel values.

Figure 8A:
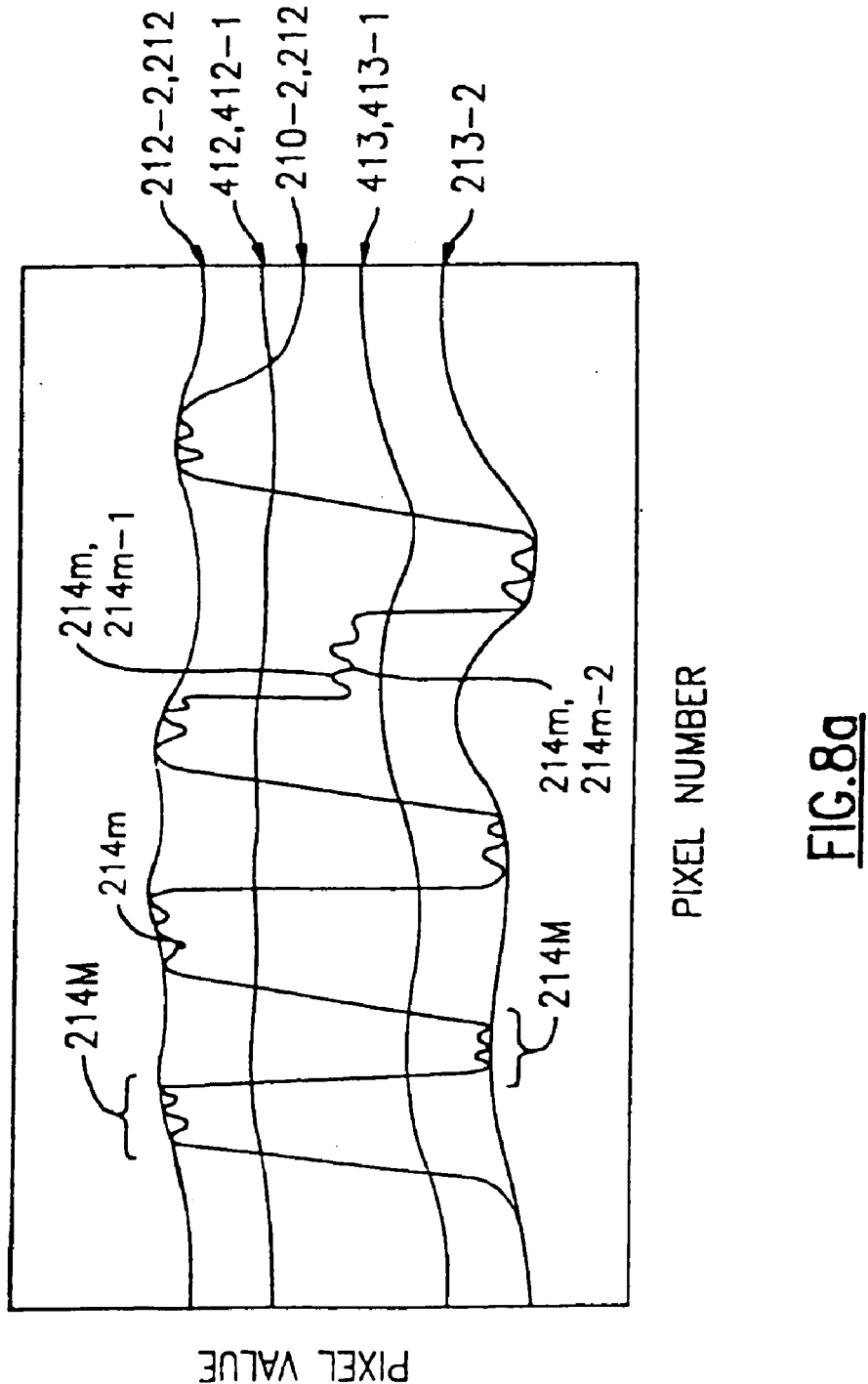
FIG. 8a is an array of pixel values illustrating grey band digitization rules.

A representation of a "noisy" array of pixel values is shown in FIG. 8a. Shown in FIG. 8a is an array of pixel values 210-2, a max peak tracking line 212-2 and a min peak tracking line 213-2 which may be determined as previously described in connection with FIGS. 6a–6c. Array of pixel values 210-2 comprises several major directional changes characterized by peaks such as peak 214M and several minor directional changes characterized by peaks such as peak 214m. In analyzing arrays of pixel values having the general characteristics of the array shown in FIG. 8a, the inventor found that whereas minor directional changes proximate either of the max or min peak tracking lines 212-2 or 213-2 are most likely attributable to noise, minor directional changes proximate the transition region of the array, such as those characterized by peaks such as peaks 214m-1 and 214m-2 are more likely attributable to bar and space transitions of a bar code than noise. Bar codes that have very thin bar or space transitions may produce signal characterized by minor transition region peaks such as peaks 214m-1 and 214m-2. In order to decode bar codes having the general characteristics of that shown in FIG. 8a, "grey band" boundary lines may be established in association with array 210-2 as is indicated by grey band lines 412-1 and 413-1 of array 210-2. Grey band lines 412 and 413 are conveniently established as a percentage of max and min peak tracking lines 212 and 213, as will be explained more fully herein. Within the grey band region, control circuit 40, for digitizing array 210 utilizes a peak sensing threshold substantially sensitive to directional changes. For example, within the grey band delimited by lines 412-1 and 413-1, control circuit 40 may establish a peak sensing level so that a peak is recorded when a pixel value increases and then decreases by more than predetermined small number of levels (such as 1 to 5 levels) of the binary scale. In the example of FIG. 8a, control circuit 40 may subject areas of array 210-2 outside of the grey band e.g. the areas including peaks 214M to peak detection using a first digitizing peak sensing threshold, and areas of array within the grey band e.g. the areas including peak 214m-1 to peak detection using a second peak sensing threshold that is more sensitive to directional changes than the first peak sensing threshold.

In accordance with the invention, control circuit 40 establishes grey band boundary lines 412 and 413 in a manner that depends on peak characterizing data developed at block 300.

For a given digitization peak sensing threshold selection, grey band boundaries 412 and 413 may be established as predetermined percentages of max peak tracking line 212 and min peak tracking line 213. For example if the 50% threshold is selected as the digitization threshold, then grey band boundaries 412 and 413 may be established at the 75% of max peak line 212 and 25% of the min peak tracking line 213 respectively. Similarly, for smaller digitization threshold selections, grey bands 412 and 413 can be established at predetermined percentages of tracking lines 212 and 213 such that they are closer to tracking lines 212 and 213.

However, for improved accuracy in the digitization process, it is normally preferable to establish either or both grey band boundaries 412 and 413 in accordance with an "average high peak" value and "average low peak" value respectively in the case that these values deviate substantially from max and min peak tracking lines 212 and 213. Establishing grey band boundaries at levels determined by the average high peak and average low peak values in the case these values deviate substantially from tracking lines 212 and 213 encourages the establishment of grey band boundaries in areas of an array such that minor peaks likely to be attributable to noise are excluded from the grey band region.

The average max peak value is the average of all maximum peaks, expressed as a percentage of max and min peak tracking lines 212 and 213, detected using the selected digitization thresholds and larger thresholds (e.g. if the 25% threshold is selected, all peaks detected using the 50% and 25% thresholds). The average min peak value is the average of all minimum peaks, expressed as a percentage of the max and min peak tracking lines 212 and 213, detected using the selected digitization threshold and data development thresholds larger than the selected digitization threshold. If all of the detected max peaks fall on max peak tracking line 212 then the average max peak value is 100%. If all of the detected min peaks fall on min peak tracking line 213 then the average min peak value is 0%. The average max peak and min peak values normally deviate from the 100% and 0% values however. In the particular example of FIG. 9b then the average high peak value is 92% of tracking lines 212 and 213 while the average min peak value is 2% of tracking lines 212 and 213.

In addition to being made dependent on the average high peak and low peak value, rules for establishing grey band boundaries 412 and 413 are also preferably made dependent on the peak sensing threshold selection.

An exemplary set of rules for establishing grey band boundaries 412 and 413 based on developed peak characterizing data developed at block 300 is as follows:

A. If the selected digitizing peak sensing threshold is 50%, establish high grey band at 75% of tracking lines unless average max or high peak value is less than 75%. If average max peak value is less than 75% set high grey band to tracking line percentage equal to average max peak value. Establish low grey band at 25% of tracking lines unless average low peak value is more than 25%. If average low peak value is more than 25% set low grey band to percentage tracking line value equal to average min low peak value.

B. If the selected digitizing peak sensing threshold is 25%, establish high grey band at 81.25% of tracking lines unless average max peak value is less than 81.25%. If average max peak value is less than 81.25% set high grey band to tracking line percentage equal to average max peak value. Establish low grey band at 18.75% of tracking lines unless average low peak value is more than 18.75%. If average low peak value is more than 18.75% set low grey band to percentage tracking line value equal to average low peak value.

C. If the selected digitizing peak sensing threshold is 12.5%, establish high grey band at 87.25% of tracking lines unless average max peak value is less than 87.25%. If average max peak value is less than 87.25% set high grey band to tracking line percentage equal to average max peak value. Establish low grey band at 12.5% of tracking lines unless average low peak value is more than 12.5%. If average low peak value is more than 12.5% set low grey band to percentage tracking line value equal to average low peak value.

D. If the selected digitizing peak sensing threshold is 6.25%, establish high grey band at 92.75% of tracking lines unless average max peak value is less than 92.75%. If average max peak value is less than 92.75% set high grey band to tracking line percentage equal to average max peak value. Establish low grey band at 6.25% of tracking lines unless average low peak value is more than 6.25%. If average low peak value is more than 6.25% set low grey band to percentage tracking line value equal to average low peak value.

It is seen from the above grey band positioning rules, that in general the grey band is established closer to the major peaks of an array of pixel values 210 when control circuit 40 selects a more aggressive peak sensing threshold as a digitizing threshold, unless average high and/or low peak values force another result. This general rule is based on the observation that the selection of a more aggressive peak sensing threshold normally indicates that an array 210 comprises a higher signal-to-noise ratio. Wide grey band regions are appropriate for digitizing arrays having higher signal-to-noise ratios.

Examples of the invention illustrating application of the above rules are described with reference to FIGS. 9a–12c. FIG. 9a illustrates a "clean," low resolution UPC linear bar code symbol comprising substantially spaced apart and substantially evenly spaced bars and spaces. FIG. 9b illustrates an array of pixel values 210-3 corresponding to the "slice" section 420 of the image representation shown in FIG. 9a. Shown in association with array 210-3 in FIG. 9b are max and min peak tracking lines 212-3 and 213-3. Peak characterizing data 430 and 431 developed by iteratively subjecting array 210-3 to incrementally aggressive peak sensing levels is shown in FIG. 9c. It is seen from peak characterizing data 430-1 that rule I applies (0 peaks detected using 25% threshold). Accordingly, because Rule I of the above threshold selection rules applies, control circuit 40 selects the 50% threshold as the digitization peak sensing threshold.

Referring now to the rules for positioning of grey band boundaries in the example of FIG. 9b, Rule A of the grey banding rules applies since the 50% threshold is selected as the digitization threshold. Because the average max peak value (92%) is higher than the default high grey band level (75%) then the default high grey band level (75%) is selected as the high grey band level. Because the average min peak value (2%) is lower than the default lower grey band boundary (25%) then the default lower band grey level (25%) is selected as the lower grey band level.

FIGS. 10a–10c illustrate applications of the invention in the decoding of a high resolution linear bar code symbol. FIG. 10a illustrates an image representation of a high resolution Code 39 linear bar code symbol. FIG. 10b illustrates an array of pixel values 210-4 corresponding to the slice section 421 of the image representation of FIG. 10a. FIG. 10c illustrates peak characterizing data 430-2 characterizing peaks of array 210-4 resulting from iterative application of incrementally aggressive peak sensing thresholds.

Peak characterizing data 430-2 in the example of FIG. 10c is divided into two parts, high peak characterizing data 430-2h and low peak characterizing data 430-2l. The example of FIG. 10c illustrates that control circuit 40 may develop two sets of peak characterizing data for a given array of pixel values, and determine two digitizing peak sensing thresholds per array of pixel values.

In the example of high peak characterizing data 430-2h, Rule III of the peak sensing threshold selection rules applies. Rule I does not apply because there is no applied threshold that yields zero new peaks. Rule II does not apply because the exception to Rule II, Rule III applies. Rule III states that if the PEAKLEVEL values decreases and then increases, establish the peak sensing level to correlate with the row at which the PEAKLEVEL value last decreased. In the example of peak characterizing data 430-2h this threshold is the 12.5% threshold.

Referring now to the low peak shape characterizing data 430-2l shown in FIG. 10c, control circuit 40 may record the PEAKLEVEL value for low peak shape characterizing data, in terms of the percent from min peak track line 213-4, as is indicated by the PEAKLEVEL values of shape characterizing data 430-2l. Accordingly, Rule III of the threshold determining rules applies if the PEAKLEVEL value increases and then decreases. Because the PEAKLEVEL value of low peak shape characterizing data 430-2l does not exhibit the pattern of increasing and then decreasing, Rule III does not apply as to low peak shape characterizing data 430-2l. Rule II instead applies and the digitizing threshold is selected to be the 6.25% threshold for the low peak values.

Applying the rules for the positioning of grey band boundaries to the example of FIGS. 10a–10c, Rule C of the grey band positioning rules applies for establishing the high grey band boundary line, and Rule D applies for establishing the low grey band boundary. Because the average high peak value (66%) is within the default boundary under rule C (87.5%), the high grey band boundary is established at a percent from tracking line value equal to the average high peak value (66%). Because average low peak value (29%) is within the default low grey band boundary under Rule D (6.25%), the low grey band boundary is established at a percent from tracking line value equal to the average low peak value (29%).

FIGS. 11a–11c illustrate applications of the invention for digitizing an "overinked" or "overgrown" symbol. "Overinked" or "overgrown" symbols are characterized by wide bars and narrow spaces. An image representation of an overinked Code 128 symbol is shown in FIG. 11a. An array of pixel values 210-5 corresponding to slice section 422 of FIG. 11a is shown in FIG. 11b. Shape characterizing data 430-3 including high peak shape characterizing data 430-3h and low peak characterizing data 430-3l are shown in FIG. 11c.

Applying the above digitization peak sensing determination rules to the high peak characterizing data 430-3h, it is seen that Rule III applies (PEAKLEVEL decreases and then increases), and the high digitizing peak sensing threshold is established, therefore, at 12.5%. Applying the above digitization peak sensing determination rules to the low peak characterizing data 430-3l, Rule II applies, and the low peak digitization peak sensing threshold is determined to be 6.25%. It is seen that operation of the peak sensing threshold determining rules results in a selection of a more aggressive low peak sensing threshold than a high peak sensing threshold in the case of an overgrown symbol. This is a useful result since high peaks are more likely to be attributable to noise than low peaks in the case of an overgrown symbol.

Applying the grey band position determining rules using high peak shape characterizing data 430-3h, it is seen that the average high peak value (55%) is within the default boundary corresponding to Rule C (87.25%). Accordingly, the upper grey band boundary is determined to be 55%. Applying the grey band position determining rules using the low peak shape characterizing data 430-3l, it is seen that average low peak value (27%) is within the default boundary corresponding to Rule D of the grey band positioning rules (6.25%). Accordingly, the low grey band is determined to be 27%. It is seen that operation of the grey band positioning rules operate to bias the grey band toward min tracking line 213-5 in the case of an overgrown symbol.

FIGS. 12a–12c illustrate application of the invention for decoding of an "undercut" symbol. "Undercut" symbols are characterized, in general, by wide spaces and narrow bars. An image representation of an undercut Code 128 symbol is shown in FIG. 12a. An array of pixel values 210-6 corresponding to slice section 423 of the image representation of FIG. 12a is shown in FIG. 12b. Peak characterizing data 430-4 corresponding to array 210-6 including high peak shape characterizing data 430-4h and low peak characterizing data 430-4l are shown in FIG. 12c.

Applying the above digitization peak sensing determination rules to the high peak characterizing data 430-4h, Rule II applies, and the low peak digitization peak sensing threshold is determined to be 6.25%. Applying the above digitization peak sensing determination rules to the low peak characterizing data 430-4l, it is seen that Rule III applies (min PEAKLEVEL increases and then decreases), and the low digitizing peak sensing threshold is, therefore, established at 12.5%. It is seen that operation of the peak sensing threshold determining rules results in a selection of a more aggressive high peak sensing threshold than a low peak sensing threshold in the example provided of an undercut symbol. This is normally a useful result since low peaks are more likely to be attributable to noise than high peaks in the case of an undercut symbol.

Applying the grey band position determining rules using high peak shape characterizing data 430-4h, it is seen that the average high peak value (82%) is within the default boundary corresponding to Rule D (92.75%). Accordingly, the upper grey band boundary is determined to be 82%. Applying the grey band position determining rules using the low peak shape characterizing data 430-4l, it is seen that average low peak value (32%) is within the default boundary corresponding to Rule C of the grey band positioning rules (6.25%). Accordingly, the low grey band is determined to be 32%. It is seen that operation of the grey band positioning rules operate to bias the grey band toward max peak tracking line 212-6 in the case of an undercut symbol. This is a useful result since minor peaks attributable to a symbol transition are expected to be found toward max peak tracking line 212-6 in the case of an undercut symbol.

Referring again to the flow diagram of FIG. 1 control circuit 40 at block 500 digitizes the image data represented by an array of pixel values utilizing at least one digitizing parameter as determined at block 440. In the example provided, control circuit 40 digitizes an array of pixel values 210 by finding bar space edges represented by an array 210. A first step of finding a bar space edge is to locate a pair of consecutive peaks, e.g. min peak 214-1 and max peak 214-2 in the example of FIG. 9b. As discussed herein control circuit 40 in accordance with the invention senses peaks of an array outside of a grey band region using a selected digitizing peak sensing threshold, and within a grey band region, a highly sensitive "grey band" peak sensing threshold. After having located a pair of successive peaks, control circuit 40 determines a transition position between the peaks, a representation of the position of a bar space transition of a bar code. In one embodiment, the transition position can be selected to be the position at which an array e.g. array 210-3 reaches a mid point value between a pair of peaks, e.g., peak 214-1 and peak 214-2 in the example of FIG. 9b. For example, if peak 214-1 is at a 0% tracking line level, and peak 214-2 is at an 80% tracking line level then the transition position between peaks 214-1 and 214-2 can be selected to be the position between peak 214-1 and peak 214-2 at which array 210-3 is at the midpoint pixel value between peak 214-1 and peak 214-2, which in the case of peaks 214-1 and 214-2 is (80%–0%)/2=40% of the tracking lines.

In the alternative, and in accordance with another aspect of the invention, the transition position between a pair of successive peaks can be derived, in part, from peak characterizing data of an array 210. Specifically a transition position can be derived, in part, based on a relationship between the average high peak value and average low peak value described herein. In the peak characterizing data corresponding to the array of FIG. 9b, the average high peak value is 92% and the average low peak value is 2%. In accordance with the invention, a transition position bias line can be established at a percent position between tracking lines 212 and 213 equal to the percentage value midway between the average high peak value and the average low peak value. By this formula, a bias line may be established at 47% of the tracking lines in the example described in connection with FIG. 9b. The transition positions can then be biased toward the established bias line. Thus, in the example of FIG. 9b the transition position between peaks 214-1 and 214-2 would be biased upward slightly since the original midpoint value at 40% of tracking lines 212-2, 212-3 is less than the bias line value of 47% of the tracking lines values. Biasing the transition position by a factor that depends on the average high peak and average low peak values increases the accuracy of the digitization. In calculating a transition position for all successive pairs of peaks of an array of pixels, control circuit 40 develop data that represents the relative widths of bars and spaces of a bar code symbol. From this data, as is well known, a message encoded by a symbol can be decoded. According to its major aspects and broadly stated the invention is a digitization method wherein a set of image data is subjected to preliminary processing for determination of at least one digitization parameter which is then utilized for digitation of the set of image data. The digitization method therefore varies depending upon features of the image data presently being subjected to digitization. In accordance with the invention, an array of pixel values, once generated, is subjected to preliminary processing for developing peak characterizing data. In particular, the peak characterizing data is developed in an exemplary embodiment of the invention by subjecting the array to iterative peak detection processing utilizing incrementally aggressive peak sensing thresholds. At least one digitizing parameter is then derived from the peak characterizing data. In an exemplary embodiment of the invention, a digitizing peak sensing threshold and "grey band" positions are developed based on the peak characterizing data. Utilizing the at least one determined digitizing parameter, edge positions for the array of pixel values are determined, and the message represented by the array of pixel value is decoded. These and other details, advantages and benefits of the present invention will become apparent from the detailed description of the preferred embodiment herein.

While the present invention has been explained with reference to the structure disclosed herein, it is not confined to the details set forth and this invention is intended to cover any modifications and changes as may come within the scope of the following claims:

What is claimed:

1. An optical reader having an image sensor, and an illumination system, said reader comprising:

generating circuit for generating an array of multibit pixel values;

establishing circuit for establishing max and min peak tracking lines for said array of pixel values;

subjecting circuit for subjecting said array of multibit pixel values to a peak characterizing data development routine, wherein said subjecting circuit includes a circuit for sensing peaks of said array of pixel values using iteratively aggressive peak sensing thresholds;

developing circuit responsive to said subjecting circuit for developing peak characterizing data characterizing peaks of said array of multibit pixel values;

determining circuit for determining a plurality of digitization parameters based on said developed peak characterizing data, wherein said plurality of digitization parameters include a peak sensing threshold parameter, and grey band position parameters; and finding circuit for finding edge positions represented by said array of pixel values utilizing said plurality of digitization parameters.

2. The reader of claim 1, wherein said generating circuit generates an array of pixel values corresponding to a row of pixels of a 1D image sensor.

3. The reader of claim 1, wherein said generating circuit generates an array of pixels corresponding to a line of pixels of a 2D image sensor.

4. The reader of claim 1, wherein said establishing circuit comprises circuitry for establishing a forward tracking line, a backward direction trackline line, and circuit for compositing said forward and backward tracking lines.

5. The reader of claim 1, wherein said subjecting circuit includes circuitry for subjecting said array of pixel values to peak sensing thresholds that depend on a difference between said max and min peak tracking lines.

6. The reader of claim 1, wherein said subjecting circuit includes circuitry for subjecting said array of pixel values to a first peak sensing threshold, a second peak sensing threshold, and a third peak sensing threshold.

7. The reader of claim 1, wherein said determining circuit determines said digitizing peak sensing threshold to be a previous data development peak sensing threshold if a present data development peak sensing threshold senses no new peaks.

8. The reader of claim 1, further comprising a calculating circuit for calculating an average max peak value and an average min peak value.

9. The reader of claim 1, further comprising a calculating circuit for calculating an average max peak value and an average min peak value, wherein said finding circuit is responsive to said calculating circuit.

10. The reader of claim 1, further comprising a calculating circuit for calculating an average max peak value and an average min peak value, wherein said finding circuit is responsive to said calculating circuit.

11. An optical reader for reading a bar code symbol having a series of bars and spaces, said optical reader comprising:

an image sensor and a control circuit, said control circuit being configured to:

(a) generate an array of multi-bit pixel values, wherein intensities of said pixel values define a generally sinusoid pattern, wherein a first set of max-min peaks of said array are attributable to bar-space transitions of said bar code symbol, and wherein a second set of max-min peaks superimposed on a major peak of said array are attributable to noise, wherein amplitudes of said first set of max-min peaks and said second set of max-min peaks have approximately the same value (b) process said array of multi-bit pixel values to discriminate between said first set and said second set of max-min peaks; and (c) digitize said first set of max-min peaks without digitizing said second set of max-min peaks.

12. The optical reader of claim 11, wherein amplitudes of said first set of max-min peaks and said second set of max-min peaks are of a common order of magnitude.

13. The method of claim 11, wherein said processing step (b) includes the steps of (i) determining peak tracking lines; (ii) establishing a grey band as a percentage of the peak tracking lines, and (iii) determining whether the set of max-min peaks are within said grey band.

14. An optical reader having an image sensor, and an illumination system, said reader comprising:

generating circuit for generating an array of multibit pixel values;

establishing circuit for establishing max and min peak tracking lines for said array of pixel values;

developing circuit for developing peak characterizing data characterizing peaks of said array of multibit pixel values, the developing circuit being responsive to a circuit that subjects said array to iteratively aggressive peak sensing thresholds;

determining circuit for determining at least one digitization parameter based on said developed peak characterizing data, wherein said at least one digitization parameter includes at least one of a peak sensing threshold parameter, and a grey band position parameter; and finding circuit for finding edge positions represented by said array of pixel values utilizing said at least one digitization parameter.

15. The reader of claim 14, wherein said generating circuit generates an array of pixel values corresponding to a row of pixels of a 1D image sensor.

16. The reader of claim 14, wherein said generating circuit generates an array of pixels corresponding to a line of pixels of a 2D image sensor.

17. The reader of claim 14, wherein said establishing circuit comprises circuitry for establishing a forward tracking line, a backward direction trackline line, and a circuit for compositing said forward and backward tracking lines.

18. A method for decoding a bar code symbol having a series of bars and spaces, said method comprising the steps of:

(a) generating an array of multi-bit pixel values, the intensities of the pixel values defining a generally sinusoidal pattern and having a first set of max-min peaks that are attributable to bar space transitions of said array and a second set of max-min peaks superimposed on a major peak of said array that are attributable to noise, wherein the amplitudes of the first set of max-min peaks and the second set of max-min peaks have approximately the same value, (b) processing said array of multi-bit pixel values to discriminate whether a certain set of max-min peaks therein are of said first set or said second set; and (c) digitizing said certain set of max-min peaks conditionally on the condition that in said processing step (b) it is determined that said certain set of max-min peaks is of said first set.

19. The method of claim 18, wherein said processing step (b) includes the steps of (i) determining peak tracking lines; (ii) establishing a grey band as a percentage of the peak tracking lines and (iii) determining whether the set of max-min peaks are within said grey band.

20. An optical reader having an image sensor, and an illumination system, said reader comprising:

generating means for generating an array of multibit pixel values;

establishing means for establishing max and min peak tracking lines for said array of pixel values;

subjecting means for subjecting said array of multibit pixel to a peak characterizing data development routine, wherein said subjecting circuit includes circuit for sensing peaks of said array of pixel values using iteratively aggressive peak sensing thresholds;

developing means responsive to said subjecting circuit for developing peak characterizing data characterizing peaks of said array of multibit pixel values;

determining means for determining a plurality of digitization parameters based on said developed peak characterizing data, wherein said plurality of digitization parameters include a peak sensing threshold parameter, and grey band position parameters; and finding means for finding edge positions represented by said array of pixel values utilizing said plurality of digitization parameters.

21. The reader of claim 20, wherein said generating means generates an array of pixel values corresponding to a row of pixels of a 1D image sensor.

22. The reader of claim 20, wherein said generating means generates an array of pixels corresponding to a line of pixels of a 2D image sensor.

23. The reader of claim 20, wherein said establishing means comprises circuitry for establishing a forward tracking line, a backward direction tracking line, and circuit for compositing said forward and backward tracking lines.

24. The reader of claim 11, wherein said reader is hand held.

25. The reader of claim 11, wherein said first set of max-min peaks is proximate a transition region of said array of multi-bit pixel values.

26. The method of claim 18, wherein said first set of max-min peaks is proximate a transition region of said array of multi-bit pixel values.

27. An optical reader for reading a bar code symbol having a series of bars and spaces, said optical reader comprising:

an image sensor and a control circuit, said control circuit being configured to:

(a) generate an array of multi-bit pixel values, wherein intensities of said pixel values define a generally sinusoid pattern, wherein a first set of max-min peaks proximate are attributable to bar-space transitions of said bar code symbol, and wherein a second set of max-min peaks are attributable to noise;

(b) process said array of multi-bit pixel values to discriminate between said first set and said second set of max-min peaks, wherein said processing step (b) includes the steps of (i) determining peak tracking lines; (ii) establishing a grey band as a percentage of the peak tracking lines, and (iii) determining whether the set of max-min peaks are within said grey band; and (c) digitize said first set of max-min peaks without digitizing said second set of max-min peaks.

28. A method for decoding a bar code symbol having a series of bars and spaces, said method comprising the steps of:

(a) generating an array of multi-bit pixel values, the intensities of the pixel values defining a generally sinusoidal pattern and having a first set of max-min peaks that are attributable to bar space transitions of said array and a second set of max-min peaks that are attributable to noise, (b) processing said array of multi-bit pixel values to discriminate whether a certain set of max-min peaks therein are of said first set or said second set, wherein said processing step (b) includes the steps of (i) determining peak tracking lines; (ii) establishing a grey band as a percentage of the peak tracking lines, and (iii) determining whether the set of max-min peaks are within said grey band; and (c) digitizing said certain set of max-min peaks conditionally on the condition that in said processing step (b) it is determined that said certain set of max-min peaks is of said first set.

\* \* \* \* \*